United States Patent
Knight et al.

(10) Patent No.: US 12,290,817 B2
(45) Date of Patent: *May 6, 2025

(54) EVAPORATION-LIMITING INSERTS FOR REAGENT CONTAINERS AND RELATED METHODS OF USE

(71) Applicant: Gen-Probe Incorporated, San Diego, CA (US)

(72) Inventors: Byron J. Knight, San Diego, CA (US); Vincent Chabot, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 1051 days.

This patent is subject to a terminal disclaimer.

(21) Appl. No.: 17/034,416

(22) Filed: Sep. 28, 2020

(65) Prior Publication Data
US 2021/0008561 A1    Jan. 14, 2021

Related U.S. Application Data

(63) Continuation of application No. 15/910,641, filed on Mar. 2, 2018, now Pat. No. 10,799,870.
(Continued)

(51) Int. Cl.
*B01L 3/00*    (2006.01)
*B01F 29/30*    (2022.01)
(Continued)

(52) U.S. Cl.
CPC .............. *B01L 3/561* (2013.01); *B01F 29/30* (2022.01); *B01F 31/22* (2022.01); *B01F 35/511* (2022.01);
(Continued)

(58) Field of Classification Search
CPC .. B01F 35/511; B01F 21/504; B01F 2101/23; B01F 29/30; B01L 3/52; B01L 3/561; B01L 3/523
See application file for complete search history.

(56) References Cited

U.S. PATENT DOCUMENTS 2,028,520 A    1/1936    Phillips
2,139,792 A *  12/1938    Bechaud ............... B65D 7/44
                                               220/501
(Continued)

FOREIGN PATENT DOCUMENTS

CN    101970111 A    2/2011
CN    204428848 U    7/2015
(Continued)

OTHER PUBLICATIONS

CNIPA Second Office Action, Chinese Patent Application No. 201880015707.6, Mar. 28, 2022.
(Continued)

*Primary Examiner* — Marc C Howell
(74) *Attorney, Agent, or Firm* — Richard Wydeven; Rothwell, Figg, Ernst & Manbeck, P.C.; Charles B. Cappellari

(57) ABSTRACT

An insert for a liquid-holding container may include a body comprising a wall, an open top end and a bottom end, and a generally tubular lumen extending from the open top end to the open bottom end. The insert may include a plurality of first openings formed in the wall, the first openings being situated between the top and bottom ends, wherein each of the plurality of first openings defines an area, and wherein the plurality of first openings have substantially the same dimensions. The insert may include one or more second openings formed in the wall, the one or more second openings being situated between the top and bottom ends, wherein each of the one or more second openings defines an area that is greater than the area defined by any of the first openings, wherein the one or more second openings have substantially the same dimensions.

16 Claims, 15 Drawing Sheets

Related U.S. Application Data

(60) Provisional application No. 62/466,856, filed on Mar. 3, 2017.

(51) Int. Cl.
| | |
|---|---|
| *B01F 31/22* | (2022.01) |
| *B01F 35/511* | (2022.01) |
| *B01F 35/71* | (2022.01) |
| *B01F 21/00* | (2022.01) |
| *B01F 23/00* | (2022.01) |
| *B01F 35/53* | (2022.01) |
| *B01F 101/23* | (2022.01) |
| *G01N 35/00* | (2006.01) |

(52) U.S. Cl.
CPC .......... *B01F 35/71805* (2022.01); *B01L 3/52* (2013.01); *B01L 3/523* (2013.01); *B01F 21/15* (2022.01); *B01F 21/502* (2022.01); *B01F 21/504* (2022.01); *B01F 23/00* (2022.01); *B01F 35/53* (2022.01); *B01F 35/71825* (2022.01); *B01F 2101/23* (2022.01); *B01L 2200/026* (2013.01); *B01L 2200/06* (2013.01); *B01L 2200/142* (2013.01); *B01L 2200/16* (2013.01); *B01L 2300/0832* (2013.01); *G01N 2035/00524* (2013.01)

(56) References Cited

U.S. PATENT DOCUMENTS

| | | | |
|---|---|---|---|
| 2,178,500 A | 10/1939 | Singer | |
| 3,341,979 A | 9/1967 | Davidson et al. | |
| 3,936,373 A * | 2/1976 | Studer | G01N 33/48 |
| | | | 422/255 |
| 3,942,660 A | 3/1976 | Paller | |
| 4,341,317 A | 7/1982 | Suzuki et al. | |
| 4,699,767 A | 10/1987 | Aihara | |
| 4,806,241 A | 2/1989 | Holien | |
| 4,821,630 A * | 4/1989 | Roberts | A47G 19/14 |
| | | | 426/77 |
| 4,882,055 A * | 11/1989 | Stamstad | B01D 29/13 |
| | | | 264/328.14 |
| 5,066,135 A | 11/1991 | Meyer et al. | |
| 5,102,631 A * | 4/1992 | Jordan | B01L 3/523 |
| | | | 422/561 |
| 5,167,448 A | 12/1992 | Herold et al. | |
| 5,234,809 A | 8/1993 | Boom et al. | |
| 5,637,214 A * | 6/1997 | Kahana | C02F 1/003 |
| | | | 210/477 |
| 5,738,234 A * | 4/1998 | Harrold | B65D 23/00 |
| | | | 215/386 |
| 6,534,273 B2 | 3/2003 | Weisburg et al. | |
| 6,666,757 B1 | 12/2003 | Kim | |
| 6,914,555 B2 | 7/2005 | Lipscomb et al. | |
| 7,135,145 B2 | 11/2006 | Ammann et al. | |
| 7,638,337 B2 | 12/2009 | Ammann et al. | |
| 7,666,602 B2 | 2/2010 | Ammann et al. | |
| 7,666,681 B2 | 2/2010 | Ammann et al. | |
| 8,182,702 B2 | 5/2012 | Al-Sannaa | |
| 8,206,648 B2 | 6/2012 | Sattler | |
| D729,579 S | 5/2015 | Molayem | |
| D749,706 S | 2/2016 | Johansen | |
| 9,629,379 B2 | 4/2017 | Lown | |
| 9,823,261 B2 * | 11/2017 | Brennan | G01N 35/00663 |
| 10,799,870 B2 | 10/2020 | Knight et al. | |
| 2005/0271550 A1 | 12/2005 | Talmer et al. | |
| 2006/0178093 A1 | 8/2006 | Hoffman | |
| 2009/0035825 A1 | 2/2009 | Kotler et al. | |
| 2009/0193880 A1 | 8/2009 | Halverson et al. | |
| 2011/0286298 A1 | 11/2011 | Zamirowski et al. | |
| 2011/0293478 A1* | 12/2011 | Robert | B01L 3/5082 |
| | | | 422/68.1 |
| 2012/0024055 A1 | 2/2012 | Knight et al. | |
| 2014/0231378 A1* | 8/2014 | Roos | B01F 35/531 |
| | | | 215/387 |
| 2014/0263163 A1 | 9/2014 | Knight | |
| 2014/0269159 A1* | 9/2014 | Buse | B01F 29/31 |
| | | | 366/218 |

FOREIGN PATENT DOCUMENTS

| | | |
|---|---|---|
| CN | 105073239 A | 11/2015 |
| DE | 9312016 U1 | 10/1993 |
| DE | 19536789 A1 | 4/1997 |
| EP | 0356883 A1 | 3/1990 |
| EP | 0853495 B1 | 11/2000 |
| GB | 2 081 118 A | 2/1982 |
| JP | S5742325 A | 3/1982 |
| JP | S58144751 A | 8/1983 |
| JP | H0280960 A | 3/1990 |
| JP | H02210266 A | 8/1990 |
| JP | H0557163 A | 3/1993 |
| JP | H0852336 A | 2/1996 |
| JP | 2002080960 A | 3/2002 |
| JP | 2003109931 A | 4/2003 |
| JP | 2007521141 A | 8/2007 |
| JP | 2008249414 A | 10/2008 |
| JP | 2008292496 A | 12/2008 |
| JP | 2008299773 A | 12/2008 |
| JP | 2010109028 A | 5/2010 |
| JP | 2010158203 A | 7/2010 |
| JP | 2011027663 A | 2/2011 |
| WO | 9957561 A2 | 11/1999 |
| WO | 2008157801 A2 | 12/2008 |
| WO | 2013187809 A1 | 12/2013 |
| WO | 2014134331 A1 | 9/2014 |
| WO | 2014153116 A2 | 9/2014 |
| WO | 2015069549 A1 | 5/2015 |

OTHER PUBLICATIONS

PCT, International Search Report and Written Opinion, International Patent Application No. PCT/US2014/029161, Oct. 31, 2014.

PCT, International Search Report and Written Opinion, International Application No. PCT/US2018/020680, May 4, 2018.

IPA, Examination report No. 1, Australian Application No. 2017200466, Oct. 31, 2018.

IPA, Examination report No. 1, Australian Application No. 2019257511, Nov. 13, 2019.

CNIPA First Office Action, Chinese Patent Application No. 201880015707.6, Mar. 1, 2021.

CNIPA Search Report, Chinese Patent Application No. 201880015707.6, Feb. 21, 2021.

CNIPA Search Report, Chinese Patent Application No. 201711174759.1, Jun. 21, 2019.

CNIPA First Office Action, Chinese Patent Application No. 201711174759.1, Jul. 1, 2019.

CNIPA Second Office Action, Chinese Patent Application No. 201711174759.1, Apr. 23, 2020.

EPO, extended European Search Report, European Patent Application No. 17153490.2, May 23, 2017.

EPO, extended European Search Report, European Application No. 17153489.4, Jun. 27, 2017.

EPO, Communication pursuant to Article 94(3) EPC, European Application No. 18711769.2, May 17, 2023.

JPO, Office Action, Japanese Patent Application No. 2016-252549, Mar. 12, 2018.

JPO, Office Action, Japanese Patent Application No. 2016-252549, Feb. 26, 2019.

USPTO, Non-Final Office Action, U.S. Appl. No. 14/211,668, May 5, 2016.

USPTO, Final Office Action, U.S. Appl. No. 14/211,668, filed Dec. 16, 2016.

USPTO, Non-Final Office Action, U.S. Appl. No. 14/211,668, filed Mar. 24, 2017.

USPTO, Final Office Action, U.S. Appl. No. 14/211,668, filed Aug. 23, 2017.

(56) References Cited

OTHER PUBLICATIONS

USPTO, Notice of Panel Decision, U.S. Appl. No. 14/211,668, filed Mar. 1, 2018.
USPTO, Advisory Action, U.S. Appl. No. 14/211,668, filed May 3, 2018.
USPTO, Examiner's Answer, U.S. Appl. No. 14/211,668, filed Jun. 28, 2018.
USPTO, Non-Final Office Action, U.S. Appl. No. 14/211,668, filed Nov. 2, 2018.
USPTO, Notice of Allowance, U.S. Appl. No. 14/211,668, filed May 28, 2019.
USPTO, Non-Final Office Action, U.S. Appl. No. 15/910,641, filed Mar. 3, 2020.
USPTO, Notice of Allowance, U.S. Appl. No. 15/910,641, filed Jun. 11, 2020.
USPTO, Non-Final Office Action, U.S. Appl. No. 15/002,664, filed May 31, 2018.
USPTO, Final Office Action, U.S. Appl. No. 15/002,664, filed Nov. 29, 2018.
USPTO, Notice of Allowance, U.S. Appl. No. 15/002,664, filed Feb. 13, 2019.
USPTO, Non-Final Rejection, U.S. Appl. No. 16/570,647, filed Jul. 9, 2021.
USPTO, Notice of Allowance, U.S. Appl. No. 16/570,647, filed Nov. 24, 2021.

* cited by examiner

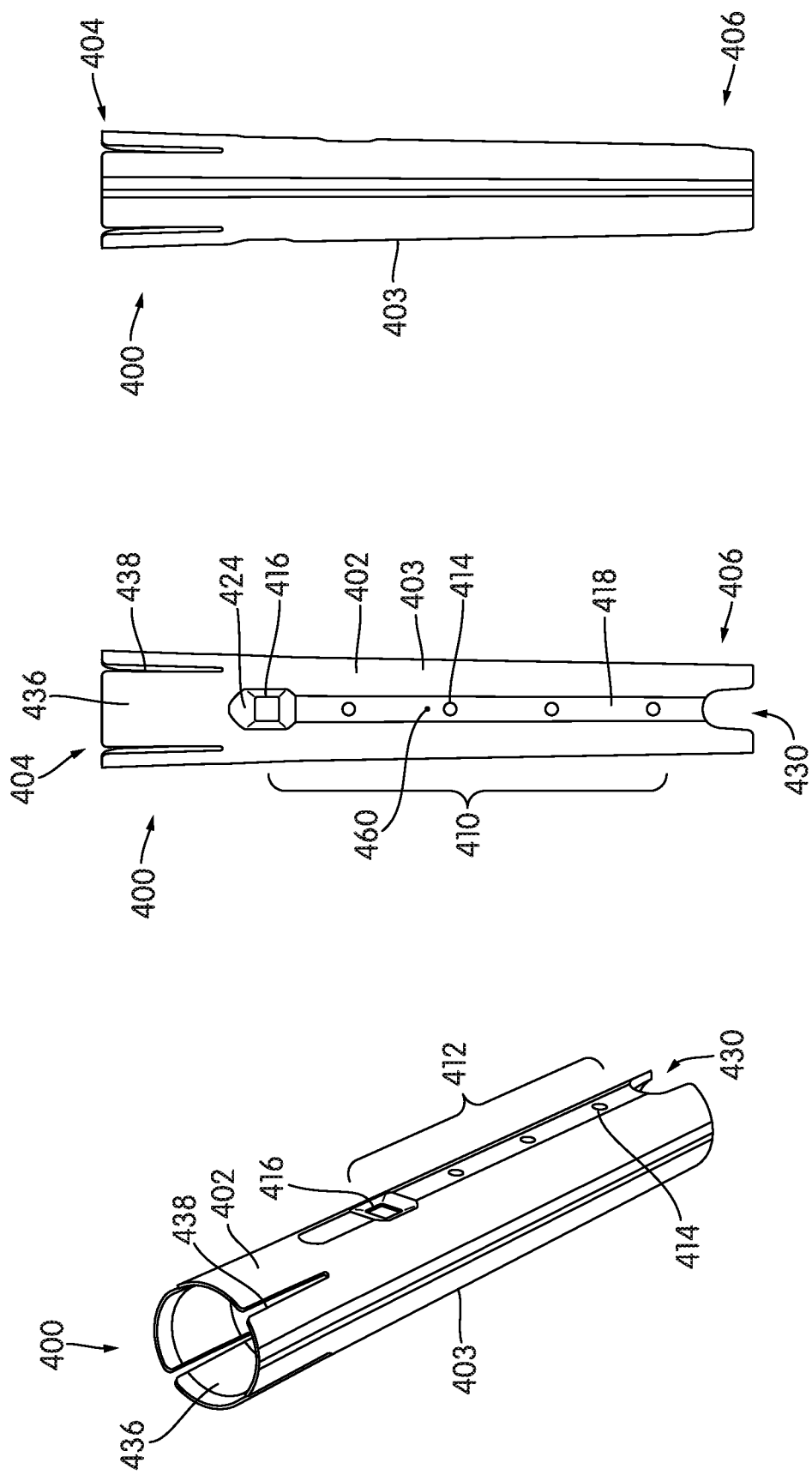

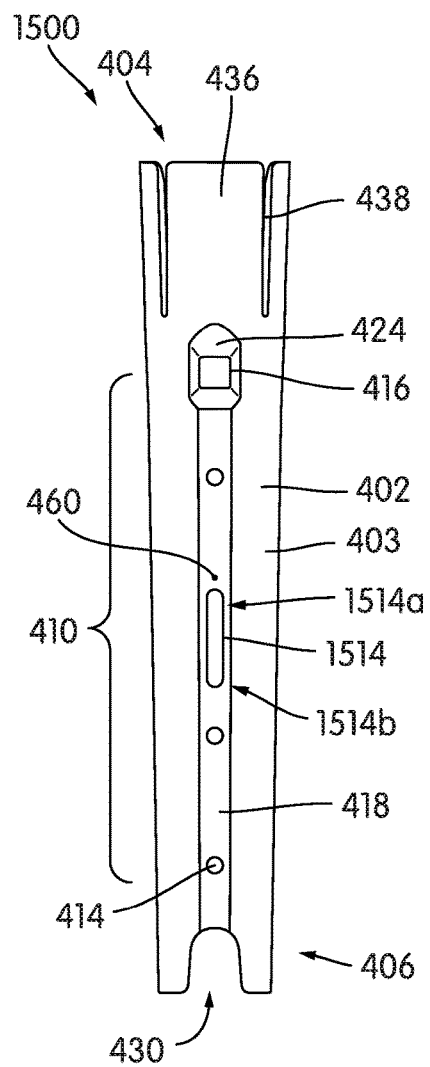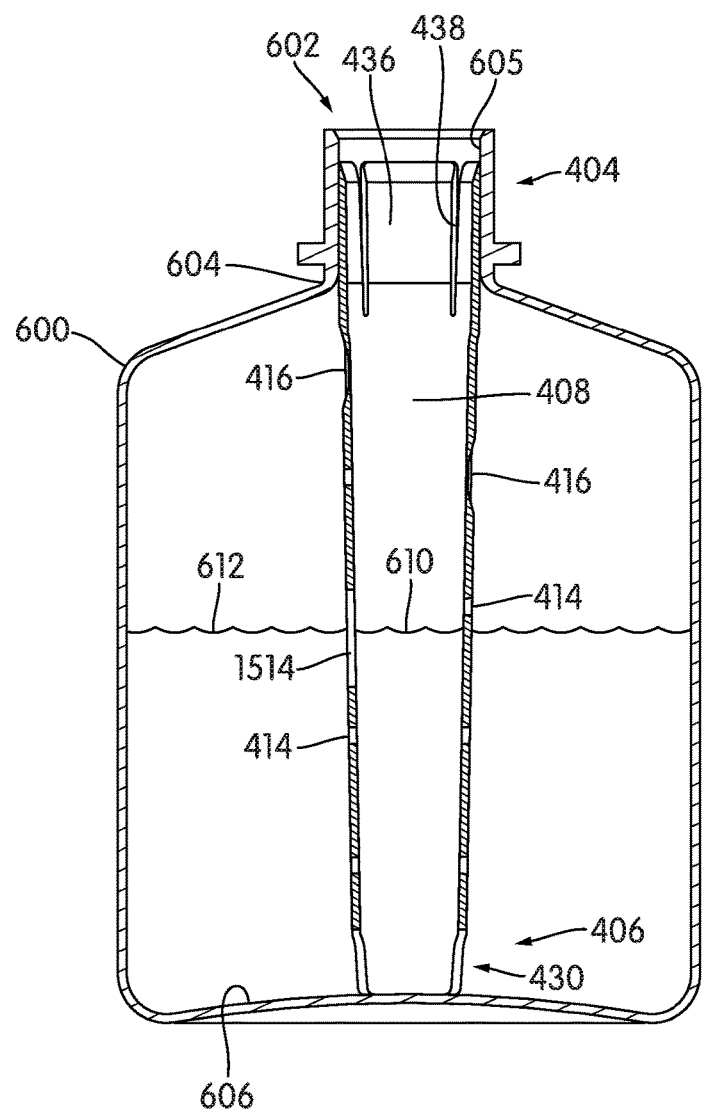
FIG. 15
FIG. 15A

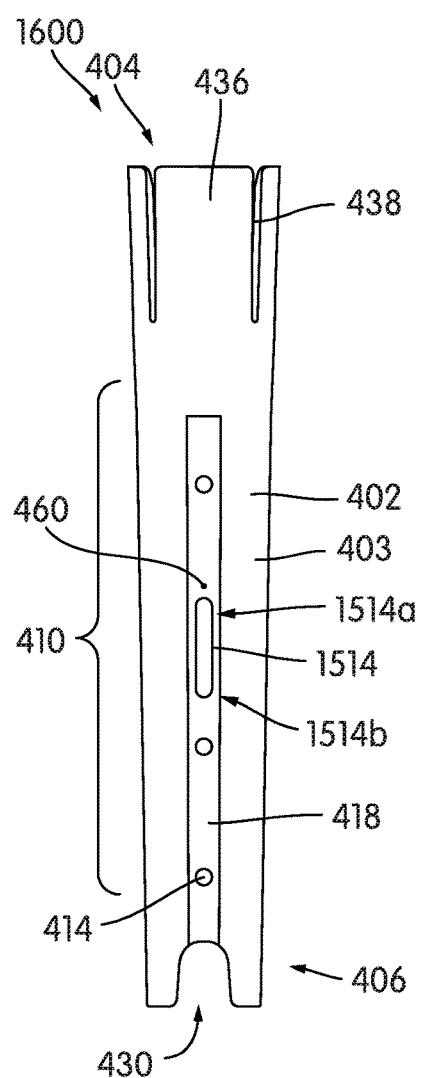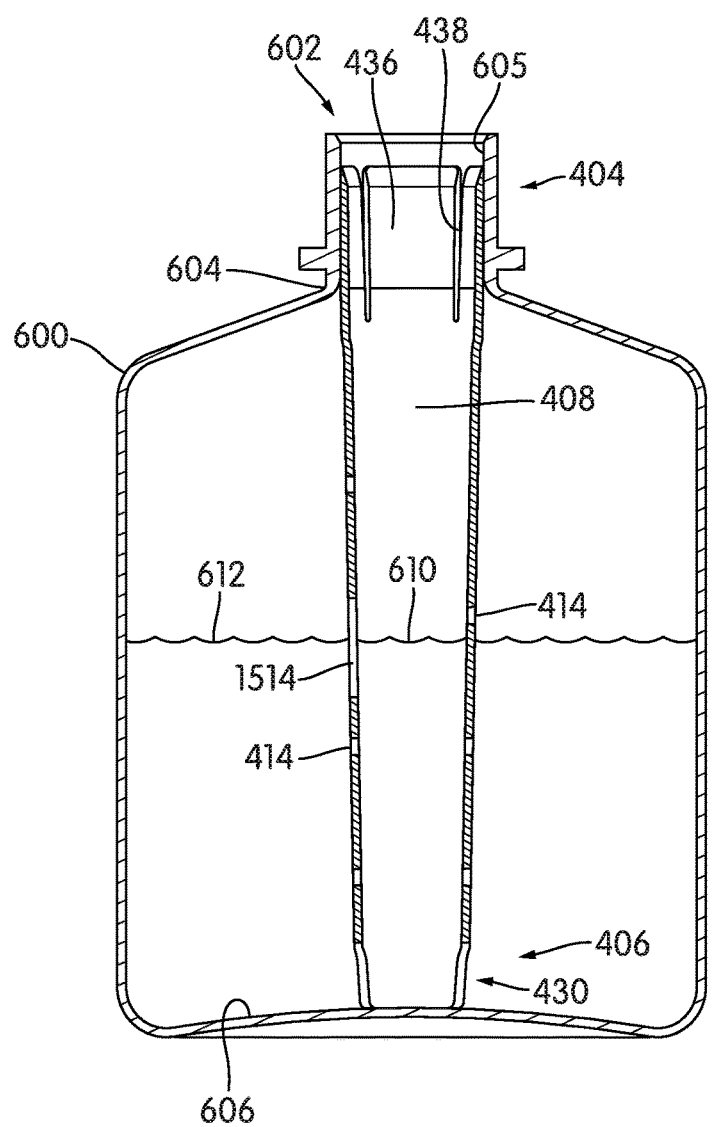
FIG. 16
FIG. 16A

EVAPORATION-LIMITING INSERTS FOR REAGENT CONTAINERS AND RELATED METHODS OF USE

CROSS-REFERENCE TO RELATED APPLICATION(S)

This patent application is a continuation of U.S. application Ser. No. 15/910,641, filed on Mar. 2, 2018, now U.S. Pat. No. 10,799,870, which claims the benefit under 35 U.S.C. § 119 to U.S. Provisional Patent Application No. 62/466,856, filed on Mar. 3, 2017, the entirety of each of which is incorporated herein by reference.

TECHNICAL FIELD

This disclosure is directed to evaporation-limiting inserts for reagent containers, and related methods of use.

BACKGROUND

Automated analytical procedures for determining the presence of an analyte in a sample typically require the use, processing, and/or manipulation of liquid solutions and/or liquid suspensions. Such liquid solutions and/or suspensions are frequently stored on analytical instruments in containers that can be accessed by a liquid transfer apparatus (e.g., robotic pipettor). The contents of the containers may be accessed through open ends of the containers (e.g., uncapped and exposed to the atmosphere) during the operation of an instrument, although it may be necessary to access the contents of a container through a penetrable seal, filter and/or septum. Leaving a container in an open state, however, leads to the evaporation of some portion of the liquid contents, very often resulting in an increased concentration of at least one component of a liquid solution or suspension. Furthermore, a liquid solution or suspension may require mixing to maintain a solute in solution or to maintain a material, such as solid or semi-solid particles, in suspension. The process of mixing a liquid solution or suspension can increase the rate of evaporation of the liquid being mixed.

Hollow inserts that limit the exposed surface area of a liquid to the atmosphere can be placed within a container to limit evaporation. These inserts can include openings arranged to facilitate mixing of a liquid solution or suspension. One possible consequence of mixing, however, is the formation of a film over openings situated above the liquid level, which can cause a vacuum to form within the container. Detergent-based liquids are especially prone to forming such films. The surface tension of the film can be great enough that liquid level differences inside and outside of the insert fail to create a pressure differential that will break the film. Differences in the liquid level inside and outside of an insert can result in inaccurate level sensing, causing an instrument to sense more or less of a liquid solution or suspension than is actually present in a container.

SUMMARY OF THE DISCLOSURE

In one aspect, the disclosure is related to an insert for a liquid-holding container, the insert comprising a body comprising a wall, open top and bottom ends, and a generally tubular lumen extending from the open top end to the open bottom end, a plurality of first openings formed in the wall, the first openings being situated between the top and bottom ends, and each of the first openings defining an area, and one or more second openings formed in the wall, the one or more second openings being situated between the top and bottom ends, each of the one or more second openings defining an area that is greater than the area defined by any of the first openings, wherein at least one of the one or more second openings is situated closer to the top end than any of the first openings, and wherein each of the first and second openings is sized to permit the passage of a liquid.

A thickness of the wall immediately surrounding each of the first openings is greater than a thickness of the wall immediately surrounding each of the one or more second openings. The thickness of the wall immediately surrounding each of the first openings is from about 0.5 mm to about 1.5 mm. The thickness of the wall immediately surrounding each of the one or more second openings is from about 0.10 mm to about 0.40 mm. The thickness of the wall immediately surrounding each of the first openings is about 1.0 mm, and the thickness of the wall immediately surrounding each of the one or more second openings is about 0.25 mm. The wall includes a chamfer surrounding each of the one or more second openings. The chamfer is a four-sided chamfer. Each of the one or more second openings is collinear with at least two of the first openings. The shape of each of the one or more second openings is rectangular or square. A width of each of the one or more second openings is from about 2.0 mm to about 8.0 mm, from about 2.0 mm to about 7.0 mm, from about 2.0 mm to about 6.0 mm, from about 3.0 mm to about 5.0 mm, about 4.0 mm, or about 3.8 mm. A width of each of the one or more second openings is at least about 2.0 mm. The shape of each of the first openings is circular. A diameter of each of the one or more first openings is from about 1.0 mm to about 4.0 mm, from about 1.0 mm to about 3.0 mm, or about 2.0 mm. A diameter of each of the one or more first openings is at least about 1.0 mm. A ratio of the area of any of the one or more second openings to the area of any of the first openings is at least about 2.0. A ratio of the area of any of the one or more second openings to the area of any of the first openings is from about 2.0 to about 8.0, from about 3.0 to about 6.0, from about 3.5 to about 5.0, from about 4.5 to about 4.6, or about 4.0. A pressure required to dislodge a film of a liquid spanning any of the one or more second openings is less than a pressure required to dislodge a film of the liquid spanning any of the first openings. The body tapers radially inwardly from the top end toward the bottom end. An inner diameter of the body is greater at the top end than an inner diameter of the body at the bottom end. At least one of the first openings is situated below a midpoint of a length of the body. A majority of the first openings are situated below a midpoint of a length of the body. Two-thirds or more of the first openings are situated below a midpoint of a length of the body. Each of the one or more second openings is situated above a midpoint of a length of the body. The insert includes at least one slot in the wall extending toward the top end from the bottom end of the insert. The at least one slot includes two opposed slots each extending from the bottom end toward the top end. The at least one slot is a recess in the bottom end of the insert. The body further includes two or more resilient tabs at the top end of the insert, the tabs being configured to deflect radially inwardly when the insert is inserted into the container and to press resiliently against an inside surface of the container. The insert includes two or more slits extending from the top end toward the bottom end in the wall of the body, wherein each of the slits separates two of the two or more resilient tabs. The body further includes one or more detents at the top end of the insert, the one or more detents being configured to engage with an inner surface of the container to secure the insert within the container. The first openings include at least two first openings aligned axially in a first row on a first side of the body. The first openings include at least two first openings aligned axially in a second row on a second side of the body, wherein the first and second rows are opposed to each other on the body. The first openings consist of only the first row and the second row of first openings. The insert includes two of the one or more second openings, a first of the second openings disposed at a top of the first row, and a second of the second openings disposed at a top of the second row. The second openings consist of only two second openings. The only two second openings are spaced a same distance from the bottom end of the body. The only two second openings are spaced at different distances from the bottom end of the body. The one or more second openings consist of only one second opening. The only one second opening is axially aligned with at least one of the plurality of first openings. The body includes one or more planar portions, and each of the first openings and the second openings is formed in the one or more planar portions. The insert includes a first slit situated entirely between the top and bottom ends of the body, wherein the first slit is longitudinally-oriented and includes a length extending between the top and bottom ends of the body that is at least two times a length or diameter of each of the first openings, and an entirety of the first slit is disposed closer to the top end than one or more first openings. The length of the first slit is at least six times the length or the diameter of each of the one or more first openings. 108. The length of the first slit is at least four times the length or the diameter of each of the one or more first openings. The slit is disposed between and collinear with at least two of the first openings or collinear with and disposed between at least one of the first openings and one of the second openings. A length of the slit is about 6.0, about 5.0 to about 7.0, about 3.0 to about 10.0, or above about 3.0 times larger than a width of the slit. The length of the slit is about 12.0 mm, from about 11.5 mm to about 12.5 mm, from about 10.0 mm to about 15.0 mm, from about 5.0 mm to about 20.0 mm, or above about 5.0 mm. A width of the slit is substantially equal to a diameter or width of at least one of the first openings. The width of the slit is from about 1.0 mm to about 4.0 mm, from about 1.0 mm to about 3.0 mm, or about 2.0 mm. The insert includes a longitudinally-oriented second slit that is circumferentially and longitudinally offset from the first slit, wherein a length of the second slit is at least two times the length or the diameter of each of the first openings. The entirety of the first slit is disposed closer to the top end than a plurality of first openings.

In another aspect, the disclosure is related to a system for limiting evaporation of a liquid from a container, comprising a container defining a volume that is partially filled by a liquid, the container defining an opening at a top end of the container, and having a top surface at a bottom end of the container; and the insert extending within the container, wherein the first end of the body is adjacent to the top end of the container, and the second end of the body is adjacent to the top surface at the bottom end of the container.

The liquid is disposed below at least one of the second openings and above a majority of the first openings. The liquid contains solid supports. The solid supports are magnetically-responsive particles or beads.

In another aspect, the disclosure is directed to a method of dispersing a component in a liquid, the method comprising agitating the container of the system, for a sufficient period of time to disperse the component within the liquid, both within the lumen and outside of the insert.

Agitating the container includes causing the container to move about an orbital path. The orbital path is a circular orbital path. The method includes, after agitating the container, withdrawing an amount of the liquid from the container. The method includes, after withdrawing the amount of the liquid from the container, agitating the container for a sufficient period of time to disperse the component within the liquid. The method includes sensing a level of the liquid inside the insert, comparing the sensed level to a threshold value, and refilling the container with an additional amount of the liquid or replacing the container when the sensed level is below the threshold value. Withdrawing the amount of the liquid from the container is performed with a pipettor, and prior to withdrawing, the method further comprises conducting capacitive liquid level detection or pressure-based liquid level detection with the pipettor to confirm that the pipettor or a pipette tip attached to the pipettor has contacted the liquid and is in a position to begin withdrawing the amount of the liquid.

In another aspect, the disclosure is related to a method of mixing, the method comprising, agitating the container of the system for a sufficient period of time to mix the liquid, both within the lumen and outside of the insert, wherein the liquid is a combined liquid comprising two or more liquids separately provided to the container.

Agitating the container includes causing the container to move about an orbital path. The orbital path is a circular orbital path. The method includes after agitating the container, withdrawing an amount of the combined liquid from the container. The method includes, after withdrawing the amount of the combined liquid from the container, agitating the container to mix the two or more liquids within the combined liquid. The method includes sensing a level of the combined liquid inside the insert, comparing the sensed level to a threshold value, and refilling the container with additional amount of each of the two or more liquids or replacing the container when the sensed level is below the threshold value. Withdrawing the amount of the combined liquid from the container is performed with a pipettor, and prior to withdrawing, the method further comprises conducting capacitive liquid level detection or pressure-based liquid level detection with the pipettor to confirm that the pipettor or a pipette tip attached to the pipettor has contacted the combined liquid and is in a position to begin withdrawing the amount of the combined liquid.

In another aspect, the disclosure is related to an insert for a liquid-holding container, the insert comprising a body comprising a wall, open top and bottom ends, a generally tubular lumen extending from the open top end to the open bottom end; one or more first openings formed in the wall, the first openings being situated between the top and bottom ends; and a longitudinally-oriented first slit enclosed by the wall, the first slit having a length and a width, wherein the length of the first slit is at least two times greater than a length or a diameter of each of the first openings, and an entirety of the first slit is disposed closer to the top end than at least one of the first openings.

The first slit is disposed between and collinear with at least two of the first openings. The length of the first slit is about 6.0, about 5.0 to about 7.0, about 3.0 to about 10.0, or above about 3.0 times larger than the width of the first slit. The length of the first slit is about 12.0 mm, from about 11.5 mm to about 12.5 mm, from about 10.0 mm to about 15.0 mm, from about 5.0 mm to about 20.0 mm, or above about 5.0 mm. The width of the first slit is substantially equal to the width or diameter of at least one of the first openings. The width of the first slit is from about 1.0 mm to about 4.0 mm, from about 1.0 mm to about 3.0 mm, or about 2.0 mm. A shape of each of the first openings is circular. A diameter of each of the first openings is from about 1.0 mm to about 4.0 mm, from about 1.0 mm to about 3.0 mm, or about 2.0 mm. A diameter of each of the first openings is at least about 2.0 mm. The body tapers radially inwardly from the top end toward the bottom end. An inner diameter of the body is greater at the first end than an inner diameter of the body at the bottom end. At least one of the first openings is situated below the midpoint. A majority of the first openings are situated between the midpoint and the bottom end. Two-thirds or more of the first openings are situated between the midpoint and the bottom end. The insert includes at least one slot in the wall extending toward the top end from the bottom end of the insert. The at least one slot includes two opposed slots each extending from the bottom end toward the top end. The at least one slot is a recess in the bottom end of the insert. The body further includes two or more resilient tabs at the top end of the insert, the tabs being configured to deflect radially inwardly when the insert is inserted into the container and to press resiliently against an inside surface of the container. The insert includes two or more additional slits extending from the top end toward the bottom end in the wall of the body, wherein each of the additional slits separates two of the two or more resilient tabs. The body further includes one or more detents at the top end of the insert, the one or more detents being configured to engage with an inner surface of the container to secure the insert within the container. The first openings include at least two first openings aligned axially in a first row on a first side of the body. The first openings include at least two first openings aligned axially in a second row on a second side of the body, wherein the first and second rows are opposed to each other on the body. The first openings consist of only the first row and the second row of first openings. The first slit is collinear with first row of first openings or the second row of first openings. The body includes one or more planar portions, and each of the first openings and the first slit are formed in the planar portions. The insert includes a longitudinally-oriented second slit that is circumferentially and longitudinally offset from the first slit. The one or more first openings includes a plurality of first openings. The entirety of the first slit is disposed closer to the top end than at least two of the plurality of first openings.

In another aspect, the disclosure is related to a system for limiting evaporation of a liquid from a container, comprising a container defining a volume that is partially filled with a liquid, the container defining an opening at a top end of the container, and having a top surface at a bottom end of the container; and the insert extending within the container, wherein the top end of the body is adjacent to the top end of the container, and the bottom end of the body is adjacent to the top surface at the bottom end of the container. A surface of the liquid is disposed between top and bottom ends of the slit. The liquid contains solid supports. The solid supports are magnetically-responsive particles or beads. The liquid is a combined liquid comprising a first liquid and a second liquid, the second liquid forming a gradient within the first liquid adjacent a surface of the liquid within the insert.

In another aspect, the disclosure is related to a method of mixing contents within a container containing an insert, the container containing a first liquid, the method comprising adding a second liquid to the container, thereby forming a combined liquid, the second liquid having a density that is lower than a density of the first liquid, wherein, after addition of the second liquid to the first liquid, a surface of the combined liquid is disposed between top and bottom ends of the first slit, and a gradient of the second liquid in the first liquid is disposed adjacent the surface; agitating the combined liquid within the container, thereby mixing the first and second liquids, both within the lumen and outside of the insert. Agitating the combined liquid includes causing the container to move about an orbital path. The orbital path is a circular orbital path. The method includes after agitating the combined liquid, extracting an amount of the combined liquid from the container. The method includes, after extracting the amount of the combined liquid from the container, agitating the container to promote mixing of the first liquid and the second liquid. The method includes sensing a level of the combined liquid inside the insert, comparing the sensed level to a threshold value, and refilling the container with an additional amount of each of the first and second liquids and additional quantity of second liquid or replacing the container when the sensed level of the combined liquid is below the threshold value. Extracting the amount of the combined liquid from the container is performed with an automated pipettor, and wherein the extracting comprises aspirating the amount of the combined liquid. Prior to extracting, the method further comprises conducting capacitive liquid level detection or pressure-based liquid level detection with the pipettor to confirm that the pipettor or a pipette tip affixed to a shaft of the pipettor has contacted the combined liquid and is in a position to begin extracting the amount of the combined liquid.

BRIEF DESCRIPTION OF THE FIGURES

The accompanying drawings, which are incorporated in and constitute a part of this specification, illustrate various embodiments and together with the description, serve to explain the principles of the disclosed embodiments.

FIG. 5 is a perspective view of an insert, according to an embodiment of the disclosure.

FIGS. 6-8 are side views of the insert of FIG. 5.

FIG. 15 is a side view of an insert, according to another embodiment of the disclosure.

FIG. 15A is a cross-sectional view of the insert of FIG. 15 and a container.

FIG. 16 is a side view of an insert, according to yet another embodiment of the disclosure.

FIG. 16A is a cross-sectional view of the insert of FIG. 16 and a container.

DETAILED DESCRIPTION

Reference will now be made in detail to embodiments of the present disclosure, which are illustrated in the accompanying drawings. Wherever possible, the same reference numbers will be used throughout the drawings to refer to the same or like parts. In the discussion that follows, relative terms such as "about," "substantially," "approximately," etc. are used to indicate a possible variation of ±10% in a stated numeric value.

Mixing Apparatus

Figure 1:
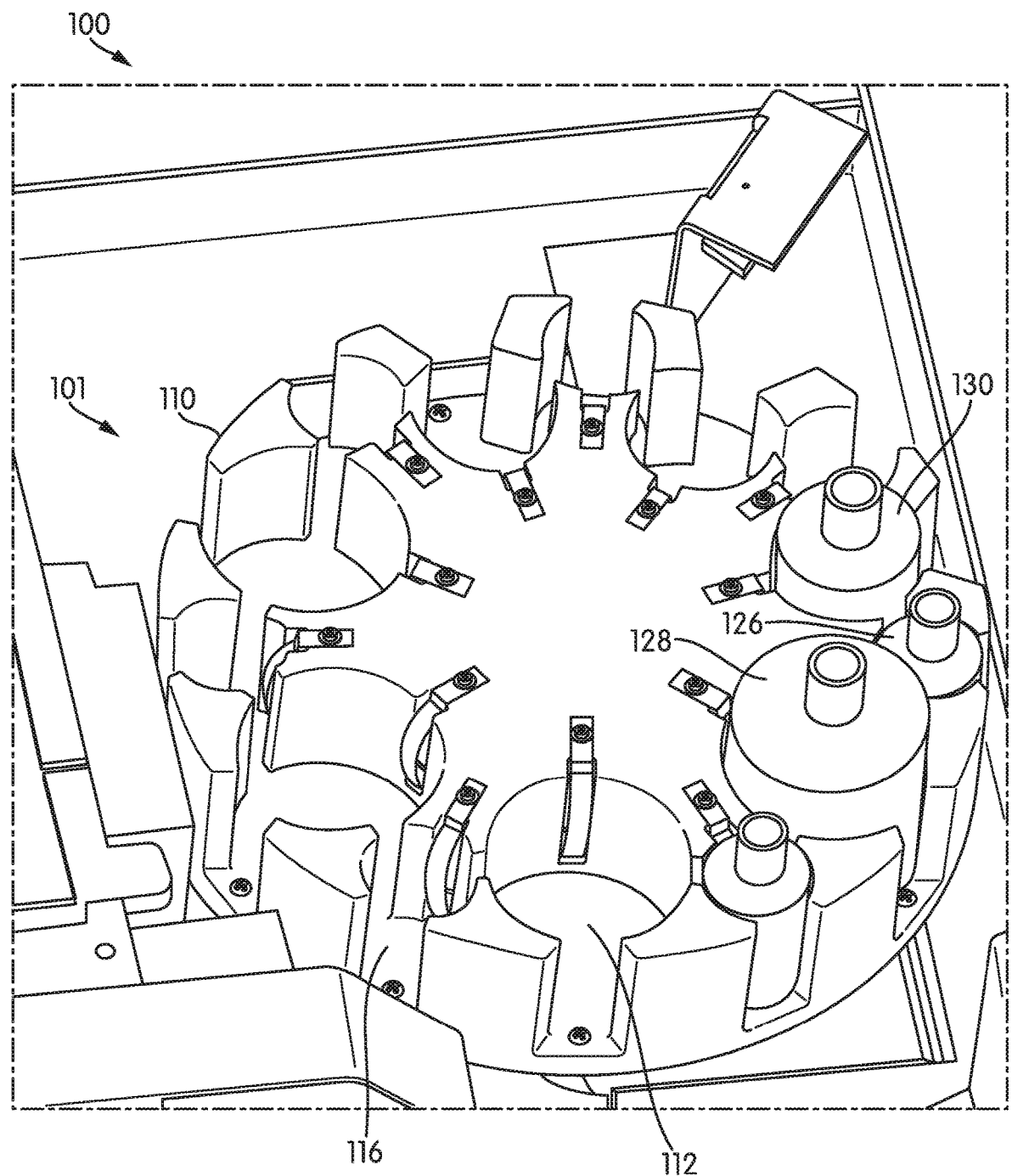
FIG. 1 is a top perspective view of a liquid container mixing apparatus, according to an embodiment of the disclosure.
Figure 2:
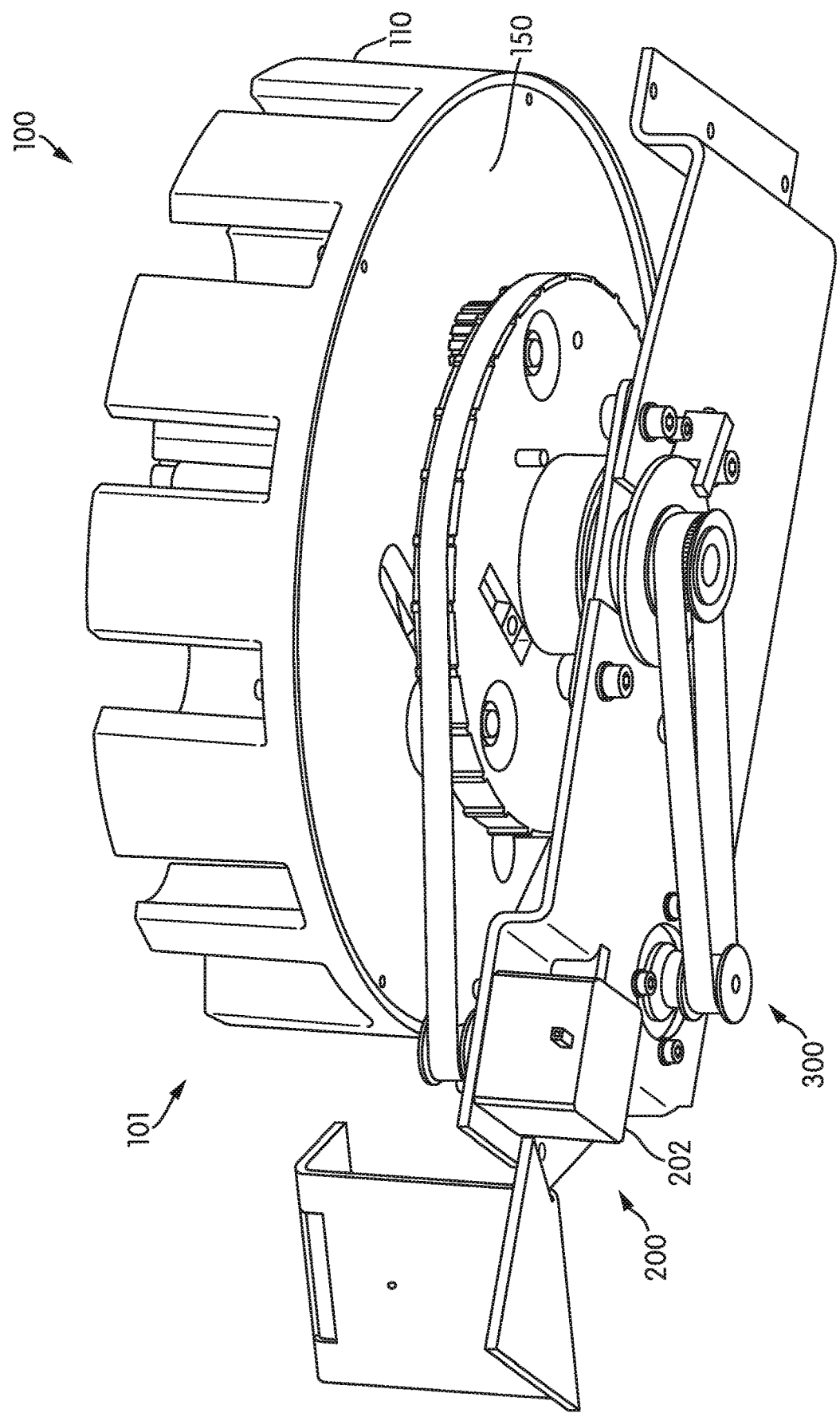
FIG. 2 is a bottom perspective view of the apparatus of FIG. 1.
Figure 3:
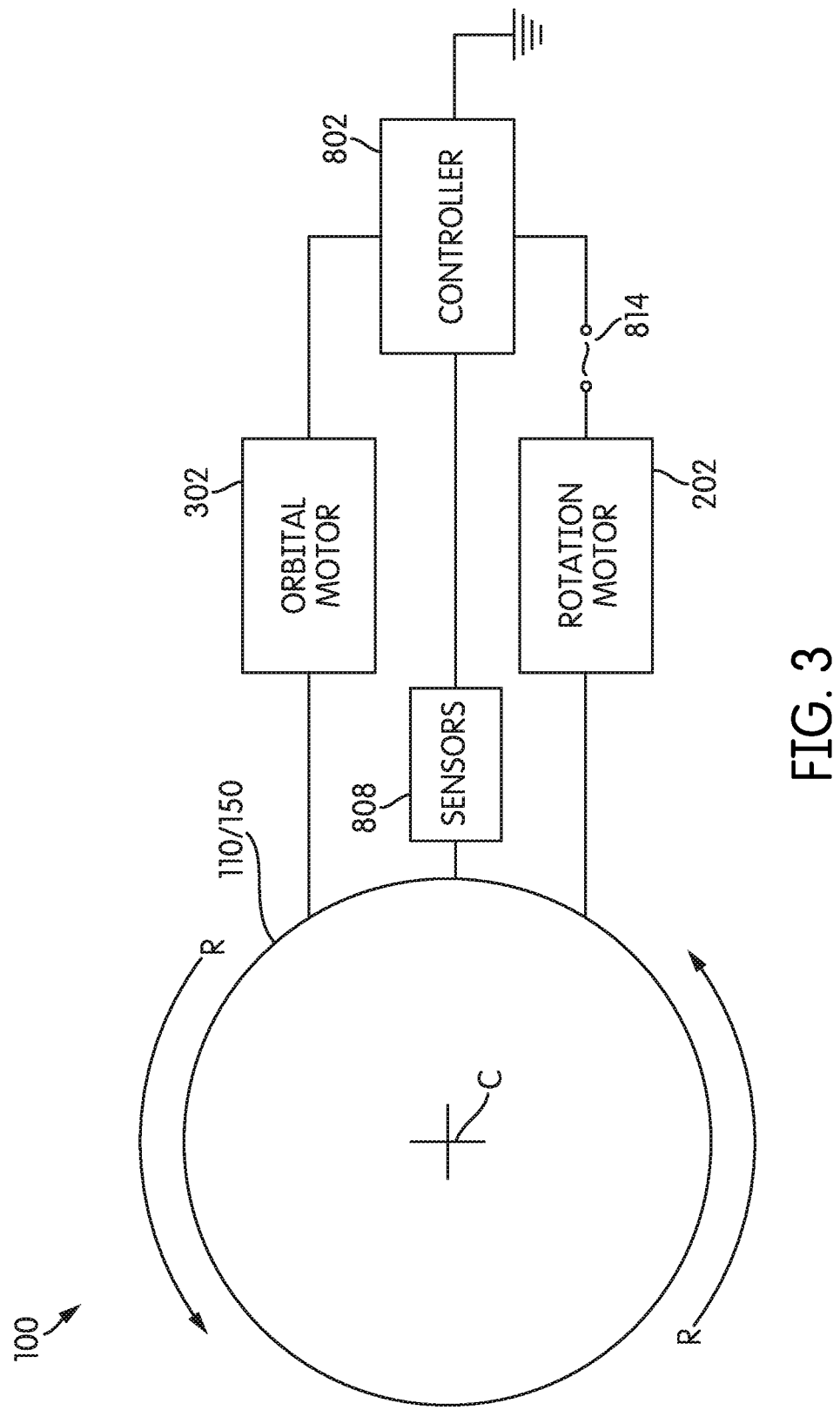
FIG. 3 is a schematic view of a power and control system of the apparatus of FIG. 1.

A liquid container mixing apparatus 100 is shown in FIGS. 1-3. The apparatus 100 may include a container support platform 101 configured to hold one or more liquid containers. In the illustrated embodiment, the container support platform is rotatable about an axis of rotation, e.g., at the center of the platform. The container support platform 101 may include a container tray 110, configured to hold a plurality of liquid containers 126, 128, and 130, and a turntable 150 (shown in FIG. 2) to which container tray 110 is mounted, otherwise attached, or integral therewith.

Figure 4:
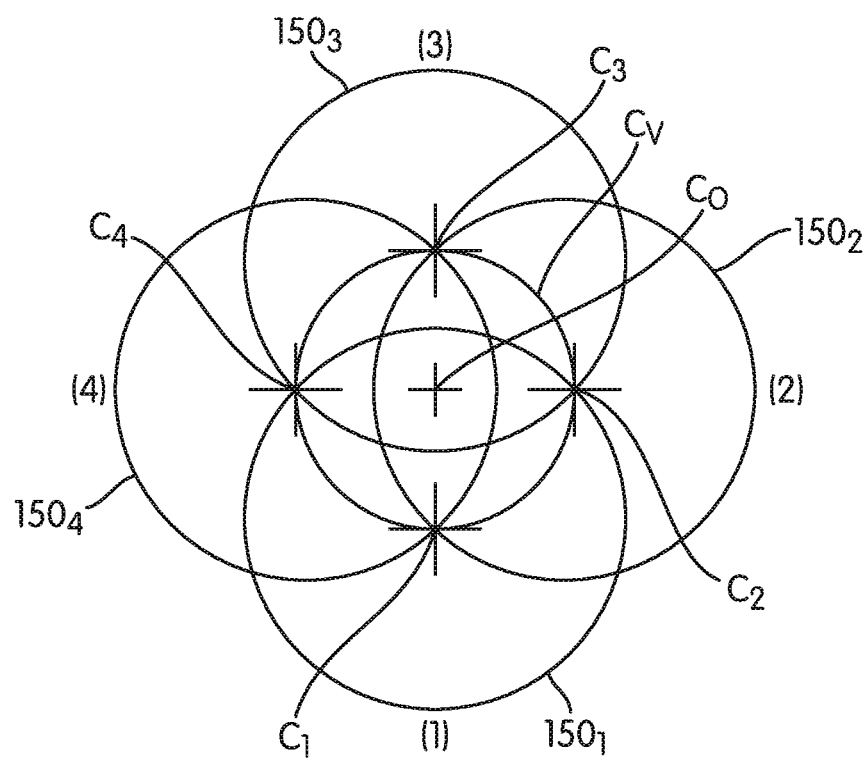
FIG. 4 is a schematic view of the orbital motion of a portion of the apparatus of FIG. 1.

Platform 101 also is configured to be movable in an orbital path about an orbital center that is, for example, offset from the center of platform 101. In the context of the present description, the terms orbit, orbital, or similar terms when used to describe the motion of platform 101 (liquid container tray 110 and turntable 150) may refer to a path of motion whereby an entirety of platform 101 moves about an orbital center independently of the rotation or spinning of liquid container support platform 101 about an axis of rotation of platform 101. FIG. 4 illustrates the orbital motion of turntable 150. During the orbital motion, turntable 150 may be moved such that the center of turntable 150 orbits about a circle $C_V$ centered at an orbital center $C_O$. The center of turntable 150 moves through positions $C_1$, $C_2$, $C_3$, $C_4$ as turntable 150 moves through positions 1501, 1502, 1503, 1504.

Apparatus 100 also may include a turntable drive system 200 (shown in FIG. 2) coupled to platform 101. Turntable drive system 200 is constructed and arranged to cause rotation or indexing of the liquid container support platform. In the illustrated embodiment, turntable drive system 200 may rotate platform 101 about an axis of rotation at the center of platform 101. Apparatus 100 also may include a drive system 300 coupled to the liquid container support platform. Drive system 300 is configured to cause orbital movement of platform 101, as described in connection with FIG. 4.

Turntable drive system 200 and drive system 300 may operate independently of each other such that platform 101 (container tray 110 and turntable 150) can be independently rotated about a central rotational axis, or caused to move about one or more orbital axes. Turntable drive system 200 and drive system 300 also may operate simultaneously to rotate and move the platform 101 about an orbital path at the same time, which may facilitate improved mixing of the contents of containers 126, 128, and/or 130 contained within container tray 110.

As shown in FIGS. 1 and 2, container tray 110 may include a plurality of cup-like, generally cylindrical container receptacles of varying sizes, such as larger container receptacles 112 and smaller container receptacles 116, configured to receive and hold liquid containers (e.g., bottles) 126, 128, and 130 of varying sizes. In addition, to accommodate different container sizes, separate drop-in adapters may be provided for receptacles 112, 116. The adapters may permit the introduction and fixed placement of liquid containers in receptacles 112, 116 that have diameters that are smaller than the diameters of receptacles 112, 116. Container tray 110 may be circular in shape, and the container receptacles 112, 116, may be symmetrically disposed about a central axis of container tray 110. Container tray 110 may be formed of any suitable material, and, in one embodiment, it is formed of molded plastic.

As shown in FIG. 2, turntable 150 may include a circular disk configured to rotate about a central axis. In other embodiments, turntable 150 may have another shape configured to rotate about an axis that is generally perpendicular to the plane of turntable 150. Turntable 150 may be formed from any suitable material having sufficient strength, rigidity, and machinability, and that may be light in weight. Suitable exemplary materials include aluminum, stainless steel, or suitable plastics, including, e.g., polystyrene, polyvinyl chloride (PVC), polypropylene, and polyethylene, among others.

Turntable drive system 200 may include a turntable drive motor 202 coupled to platform 101. Additionally, turntable drive system 200 may be substantially similar to the turntable drive system described in U.S. Patent Application Publication No. 2014/0263163.

FIG. 3 is a schematic view of a control system for controlling operation of apparatus 100. As set forth above, apparatus 100 may be configured to provide independent or simultaneous rotation about a central axis, and/or an orbital movement of the containers to agitate the contents of the containers. The rotation of turntable 150 is shown in FIG. 3 by arrows R, which represents rotation of turntable 150 about the center C. The rotation of turntable 150 may be powered by drive system 200, and in particular, by drive motor 202. Orbital motion is powered by drive system 300 comprising a motor 302. Drive motor 202 and motor 302 may be coupled to and controlled by a controller 802 that also is connected to a controllable power supply 814. Controller 802 may provide power and operational control signals to drive motor 202 and motor 302. Controller 802 also may receive data from drive motor 202 and motor 302 in the form of rotary encoder counts as well as other feedback sensor signals. Feedback sensors 808 may be coupled to apparatus 100, and may include, e.g., a rotational home flag, a position home flag, etc. Sensors 808 may be connected to the controller 802 for providing positional, or other status, feedback that is used in generating control signals for operating drive motor 202 and motor 302.

Evaporation-Limiting Insert

The liquid contents of containers 126, 128, and 130 carried on container tray 110 of the mixing device 100 may comprise liquid solutions or suspensions. Representative liquid contents may comprise reagents containing solid supports, such as silica or magnetically-responsive particles or beads. See, e.g., U.S. Pat. No. 5,234,809 and U.S. Pat. No. 6,534,273. The solid supports may have a diameter from about 0.68 to about 1.00 μm. Such solid supports can be useful for immobilizing nucleic acids in a sample processing procedure to remove inhibitors of amplification and/or detection. Other suitable reagents include, e.g., target enhancing reagents used for alkaline shock treatment as described U.S. Pat. No. 8,420,317. A reagent may be a substance or mixture for use in chemical analysis or other reactions. As discussed elsewhere in this disclosure, mixing of the liquid contents, e.g., by agitating the container containing the liquid contents, may help to maintain the suspended materials in suspension within the liquid and/or re-suspend materials that have precipitated or otherwise come out of solution/suspension. Other suitable reagents may include those used in ChargeSwitch® nucleic acid purification kits provided by Thermo Fisher Scientific®, and those described in U.S. Patent Application Publication No. 2006/0084089.

Even in the absence of suspended particles or solid supports, it may be possible for one or more components of a liquid solution to precipitate out of solution, potentially affecting the concentration of the solution that is drawn out of the container. In particular, evaporation may occur within insert 400, increasing the concentration of the solution within insert 400. Even small changes in concentrations can have an adverse effect on a test or assay performed with such solutions.

The containers may be carried in an open state to permit ready access to the liquid contents of each of the containers by a liquid transfer apparatus, such as a robotic pipettor. In other embodiments, the containers may be sealed and/or include a filter or septum to limit aerosol dissemination of the reagent, and to further control for evaporation of the reagent. The liquid transfer apparatus may access the liquid contents of the container to withdraw liquid from the container and/or to dispense additional liquid into the container. The liquid transfer apparatus may include a pipettor configured to detect a liquid surface within the container, e.g., for the purpose of determining or verifying the height of the liquid within the container, which can be used to calculate the volume of liquid remaining in the container. Suitable pipettors for this purpose are disclosed by U.S. Pat. No. 6,914,555. Level sensing, including, for example, capacitive level sensing, also may be used to signal that an aspiration step may be initiated, or to signal for the initiation of the aspiration step for withdrawing at least a portion of the liquid contents of a container. For example, once the surface of a liquid is detected, the pipettor may continue along a downward path as liquid is aspirated from the container. Alternatively, after the surface of a liquid is detected, the pipettor may descend a predetermined distance before aspiration is initiated. In the latter approach, the pipettor may remain stationary during aspiration. The pipettor may employ at least one or more of capacitive liquid level detection (cLLD) and pressure-based liquid level detection (pLLD). Capacitive liquid level detection may be performed with the use of a conductive, disposable pipette tip mounted on a tip holder of the pipettor.

When the containers are in an open state, the liquid contents of the containers are exposed to the atmosphere and, therefore, are susceptible to evaporation. Mixing may exacerbate this problem, as mixing results in increased exposure of a liquid surface to the atmosphere, thereby potentially accelerating the rate of evaporation.

An evaporation-limiting insert 400 for reducing the amount of evaporation from a container (e.g., container 600 shown in FIGS. 11 and 12) is shown in FIGS. 5-12. Insert 400 may include a body 402 having a wall 403 extending from a first (top) end 404 toward a second (bottom) end 406.

A lumen 408 (shown in FIGS. 11 and 12) may extend through body 402 from first end 404 to second end 406. First end 404 and second end 406 each may be open and in communication with lumen 408. First end 404 and second end 406 may be about 95.0 mm to about 105.0 mm apart from one another, or about 103.0 mm apart from one another, although other suitable dimensions are also contemplated. In some embodiments, insert 400 may enclose a volume of 280 mL, although other suitable volumes also are contemplated. In the embodiment shown in FIGS. 5-12, body 402 is tapered with a decreasing dimension, e.g., diameter, from the first end 404 toward second end 406 such that the diameter of body 402 is larger at first end 404 than at second end 406. In one embodiment, body 402 may have a diameter or width at first end 404 from about 17.6 mm to about 19.2 mm, although other suitable dimensions larger and smaller also are contemplated. Body 402 may have a diameter or width from about 13.4 mm to about 15.4 mm, or about 14.4 mm, at second end 406, although other suitable dimensions larger and smaller also are contemplated. Body 402 may be substantially tubular or cylindrical in some embodiments.

Insert 400 may be injection molded. The mold may include two halves and a core pin that forms a center. The side holes may be formed by the two halves of the mold. To release insert 400, the core pin may be removed and the two halves may be opened. Insert 400 may stick to one side of the mold, and ejector pins may be used to push insert 400 out of the mold.

Body 402 may include one or more inert materials, including, e.g., an inert plastic that does not leach material into a liquid contained within container 600. Additionally, it is preferable that the liquid not degrade the material used to form insert 400 or container 600 (i.e., the plastic or other material selected has chemical compatibility with the liquid it is intended to be used with). In one embodiment, insert 400 and a cap of container 600 includes polypropylene (PP), while container 600 includes high-density polyethylene (HDPE), although other suitable polymers and/or plastics also are contemplated.

Figure 12:
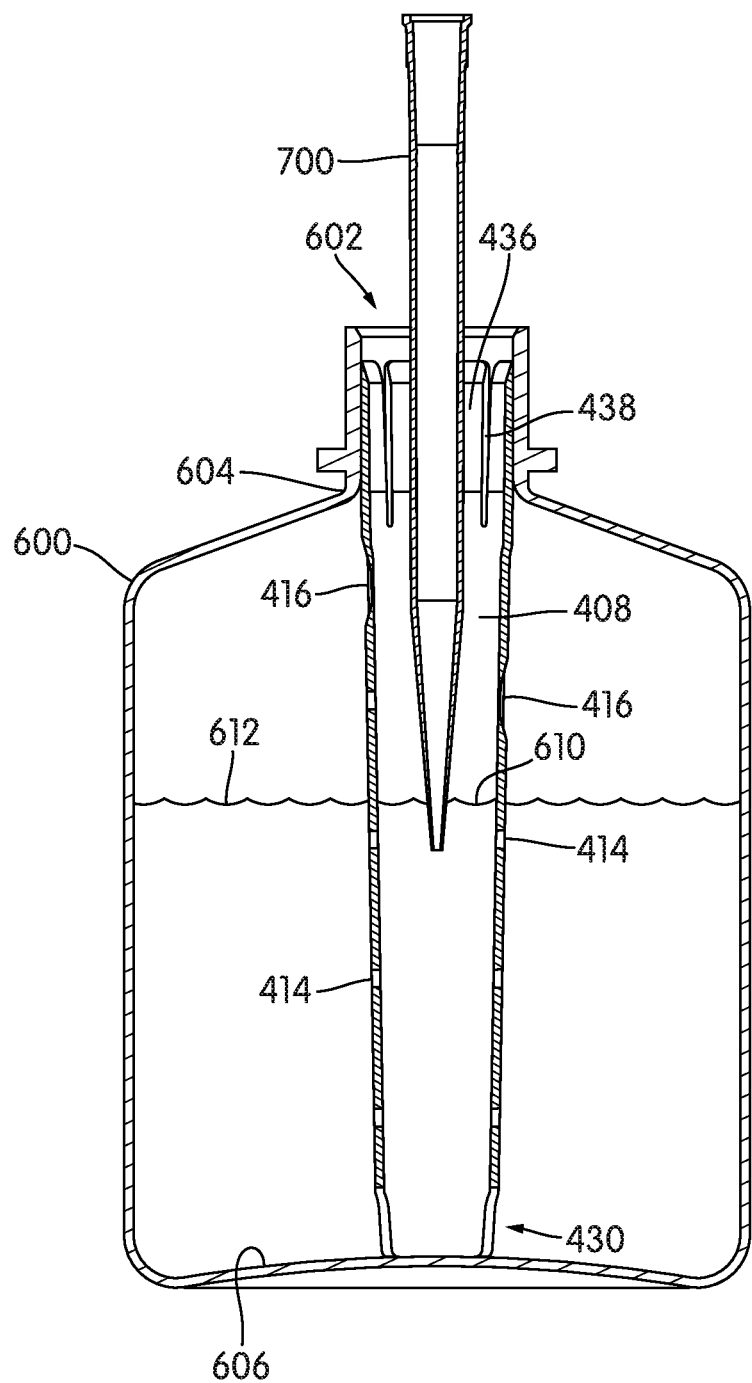
FIG. 12 is a cross-sectional view of an insert, a container, and a pipette tip, according to an embodiment of the disclosure.

The tapered shape of body 402 may generally conform to the shape of a pipette tip, such as, e.g., pipette tip 700 shown in FIG. 12. Such an arrangement may further limit evaporation from container 600, because as a liquid is withdrawn from container 600 via insert 400, the liquid level may drop and the surface area of the liquid within insert 400 and exposed to the atmosphere may become increasingly smaller. In some applications, however, the potential benefits of tapering to reduce evaporation may need to be balanced with a need to prevent contact between insert 400 and pipette tip 700. If pipettor-based level sensing is employed, contact between the pipette tip and the container insert could signal an incorrect position of the liquid surface, and an associated analyzer could prematurely initiate an aspiration step before the pipette tip has actually contacted the liquid surface.

Body 400 may include a plurality of openings extending through the wall 403. Each of the plurality of openings may extend into lumen 408. Body 400 may include a first row 410 of openings (FIGS. 6 and 9) and a second row 412 of openings (shown in FIGS. 5, 8, and 9). First row 410 and second row 412 each may include one or more first openings 414 and/or one or more second openings 416. An opening may be a through-hole. At least one of first openings 414 may be below a midpoint of the height (or length measured along an axis) of body 402. In other embodiments, at least half of the first openings are located below the midpoint. In yet other embodiments, at least two-thirds of the first openings are located below the midpoint. In yet further embodiment, all of the first openings 414 are located below the midpoint. Each of second openings 416 may be located above a midpoint 460 located halfway between first end 404 and second end 406. In some embodiments, each of first openings 414 and/or second openings 416 of a given row (e.g., first row 410 and second row 412) may be collinear and/or longitudinally aligned. In other embodiments, one or more of first openings 414 and/or second openings 416 of a given row may be offset from other openings of the given row. First row 410 may be disposed within a flat surface 418 that is recessed from the outer surface of wall 403, and second row 412 may be disposed within a flat surface 420 that is recessed from the outer surface of wall 403. Flat surfaces 418 and 420 may facilitate the formation of openings 414 and 416 during molding of the insert 400. While two rows are shown in the embodiment of FIGS. 5-12, only one of first row 410 and second row 412 may be present in some embodiments, or additional rows of openings may be used. Any suitable number of first openings 414 and/or second openings 416 may be included on insert 400. However, while a greater number of openings may improve mixing within insert 400 and container 600, a greater number of openings also may increase evaporation relative to a design with fewer openings. It also is contemplated that at least one opening is disposed below a liquid line of the reagent within the container 600 to facilitate mixing of the reagent.

First openings 414 from first row 410 and second row 412 that are closest to second end 406 may be about 16.0 mm away from second end 406, as measured from a center of the respective opening to the terminal portions of first end 404 or second end 406. Additionally, adjacent first openings 414 may be about 16.0 mm away from one another, as measured between the centers of the adjacent first openings 414. Second opening 416 of row 412 may be about 16.0 mm away from an adjacent first opening 414, about 64.0 mm from second end 406, and about 39.0 mm from top first end 404. Second opening 416 of row 410 may be about 13.0 mm away from an adjacent first opening 414, about 77.0 mm from second end 406, and about 26.0 mm from first end 404. Other values for the dimensions set forth in this paragraph also may be utilized.

Figure 8:
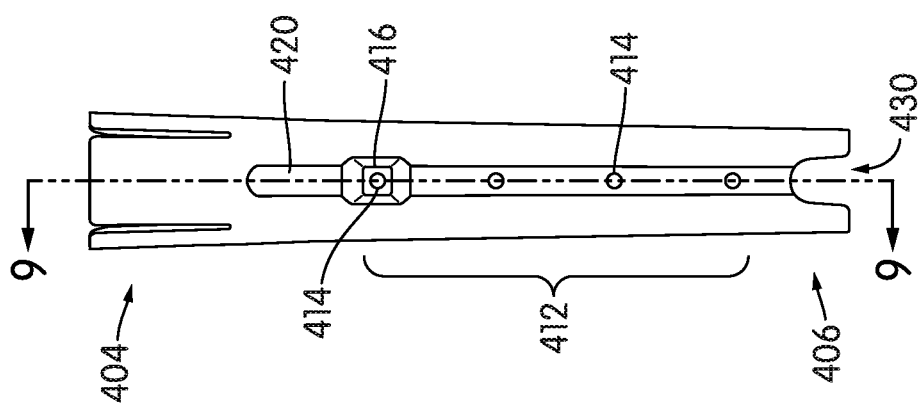

First row 410 and second row 412 may be located on opposing sides of body 402, e.g., may be disposed 180 degrees from one another about a circumference of body 402, although other spacing arrangements are also contemplated. A given opening of first row 410 may be circumferentially aligned (at the same height) and/or diametrically aligned (180 degrees apart) with an opening of second row 412, and vice versa. Referring to FIGS. 6 and 8, the three first openings 414 of first row 410 closest to second end 406 may be circumferentially and diametrically aligned with the three first openings 414 of second row 412 closest to second end 406. Also, second opening 416 of second row 412 may be circumferentially and diametrically aligned with a first opening 414 of first row 410, which in FIG. 8 can be seen through second opening 416 of second row 412. It also is contemplated that certain first openings 414 and/or second openings 416 may not be circumferentially or diametrically aligned with another first opening 414 or second opening 416. For example, the second opening 416 of first row 410 is not circumferentially or diametrically aligned with any other first opening 414 or second opening 416.

First openings 414 may be circular, although any other suitable shape may be utilized, such as, e.g., rectangular, square, diamond, ovular, irregular, or the like. First openings 414 may have any suitable diameter or width. In one embodiment, the diameter or width of first opening 414 may be from about 1.0 mm to about 4.0 mm, from about 1.0 mm to about 3.0 mm, or about 2.0 mm. In one embodiment, the diameter or width of first opening 414 may be at least about 1.0 mm. Each first opening 414 of insert 400 may have substantially the same dimensions as other first openings 414 (accounting for manufacturing variability), or the various first openings 414 may have different dimensions. For example, some of first openings 414 may have a diameter of about 2.0 mm, while other first openings 414 may have a diameter of about 3.0 mm. In another embodiment, first openings 414 may increase or decrease in diameter moving from first end 404 to second end 406 of insert 400.

Second openings 416 may be square as shown in FIGS. 5, 6, and 8, although any other suitable shapes may be utilized, such as, e.g., rectangular, circular, diamond, ovular, irregular, or the like. Second openings 416 may have any suitable diameter or width. The diameter or width of second openings 416 may be larger than the diameter or width of at least one first opening 414, or may be larger than the diameter or width of all first openings 414. In one embodiment, the diameter or width of second opening 416 may be from about 2.0 mm to about 8.0 mm, from about 2.0 mm to about 7.0 mm, from about 2.0 mm to about 6.0 mm, from about 3.0 mm to about 5.0 mm, about 4.0 mm, or about 3.8 mm. In one embodiment, the diameter or width of second opening 416 may be at least about 2.0 mm. Each second opening 416 of insert 400 may have substantially the same dimensions as other second openings 416 (accounting for manufacturing variability), or the various second openings 416 may have different dimensions. Within a given row (e.g., first row 410 and second row 412) of openings, a second opening 416 may be disposed closer to first end 404 than any first opening 414. However, it also is contemplated that one or more rows of openings may not include any second opening 416.

The area of a second opening 416 may be from about 2.0 to about 8.0 times, from about 3.0 to about 6.0 times, from about 3.5 to 5.0 times, or about 4.0 times the area of a first opening 414. In another embodiment, the area of a second opening 416 may be about 4.5 to about 4.6 times the area of a first opening 414. In another embodiment, the area of a second opening 416 may be at least about 2.0, at least about 2.5, at least about 3.0, at least about 3.5, at least about 4.0, or at least about 4.5 times greater than the area of a first opening 414.

Figure 10:
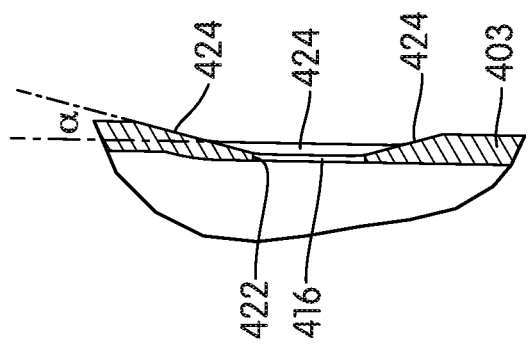
FIG. 10 is an enlargement of a portion of the cross-sectional view of FIG. 9.
Figure 9:
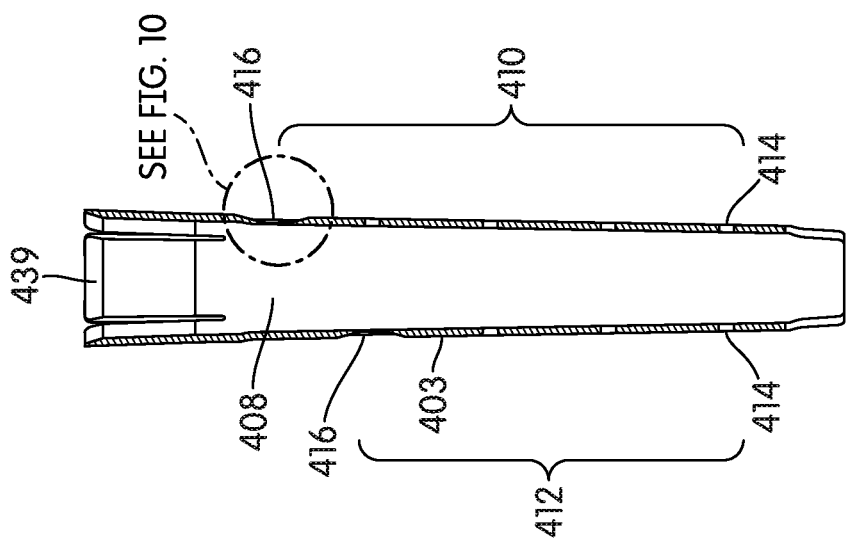
FIG. 9 is a cross-sectional view of the insert taken along line 9-9 of FIG. 8.

A thickness of wall 403 may be reduced in the region that borders second openings 416. For example, as best seen in FIG. 10, a thinned border 422 of wall 403 may surround the periphery of second openings 416. The thinned border may be from about 0.10 mm to 0.40 mm thick, from about 0.20 mm to about 0.30 mm thick, or about 0.25 mm thick. Wall 403 may increase in thickness moving away from border 422. Flat surfaces 418 and 420 each may have a thickness from about 0.5 mm to about 1.5 mm, or about 1.0 mm, although other suitable values are contemplated. The remainder of wall 403, except for thinned borders 422, may have the same thickness as flat surfaces 418 and 420. In some embodiments, the four sides of a square shape opening 416 may be defined by a four-sided chamfer 424. Border 422 may lie in a plane, and chamfer 424 may include angled portions that extend radially outward at an angle $\alpha$ relative to the plane. The angle $\alpha$ may be from about 12 to about 18 degrees, from about 14 to about 16 degrees, or about 15 degrees, or may be another suitable angle.

It also is contemplated that the thinned border may be formed by other suitable methods that do not include a gradual slope from a remaining thickness of wall 403. For example, border 422 may be formed by stamping wall 403 in the regions surrounding the periphery of second openings 416 to create a thinned and stepped border area.

The larger width and area of second openings 416, the thinner border around second openings 416, and the square shape of second openings 416 may help prevent the formation of liquid films over second openings 416, require less force to overcome films that do form, and/or prevent plugging of second openings 416, which in turn, may prevent a vacuum from forming within container 600 and insert 400. The square shape, and/or larger diameter/dimension, of second openings 416 may increase the distance over which a film must span, decreasing the likelihood that any film will form over second openings 416, and reducing the force required to overcome any films that do form in square-shaped second openings 416. Further, the thin border around second openings 416 reduces the area where liquid could collect and form a film, or otherwise block second opening 416. The likelihood of a film forming over second openings 416 is further reduced where the top level of a liquid within a container is situated below second openings 416. In some embodiments, second openings 416 may be situated at different distances relative to first end 402. In such embodiments, the top level of liquid may be above one of the second openings 416 and below another of the second openings 416.

Insert 400 may include one or more axial slots 430 extending from second end 406 toward first end 404. Slots 430 may have any suitable dimensions. For example, slots 430 may have a length of, e.g., about 7.0 to about 9.0 mm, of about 8.0 mm, or another suitable length. In one embodiment, insert 400 may include two diametrically opposed slots 430 that are separated from one another by 180 degrees. In another embodiment, insert 400 may include only one slot 430, or two or more slots 430. When multiple slots 430 are used, they may be spaced apart from one another at even or uneven intervals. Slots 430 may be flared out as shown in FIGS. 5, 6, and 8, such that slot 430 is wider at one end, e.g., the bottom end at second end 406, than at an opposite end, e.g., the top end closer to first end 404. In some embodiments, slots 430 may remain below a dead volume of liquid within a container, which may be a volume below which a container is no longer used by the automatic analyzer. That is, when the volume within the container is at or below the dead volume (or minimum volume threshold), the container may be refilled with more reagent, or replaced entirely.

In various embodiments, insert 400 may include one or more resilient tabs 436 defined by one or more slits 438 extending from first end 404 toward second end 406. The tabs 436 may be configured to flex radially inward in response to a radially-inward directed force (e.g., when insert 400 is inserted into the opening of container 600 shown in FIGS. 11 and 12). When flexed radially inwardly, the tabs may apply a radially outward directed force that may help secure insert 400 within container 600. Additionally or alternatively to the tab and slit arrangement described above, insert 400 may include one or more detents (not shown) that may engage an inner surface of container 600, including detents described in U.S. Patent Application Publication No. 2014/0263163. For example, the one or more detents may engage with corresponding recesses located on the inner surface of container 600. Other suitable retention features are also contemplated, including, for example, snap fit arrangements, friction fit arrangements, latches, and the like. In some embodiments, one or more of the tabs 436 may include a beveled top surface 439. Beveled top surface 439 may assist the insertion of a pipette tip, or other device of substance, into container 600. Without the bevel, it is possible that pipette tip 700 could contact a top ledge of insert 400 when directing pipette tip 700 into insert 400.

Container and Insert

Figure 11:
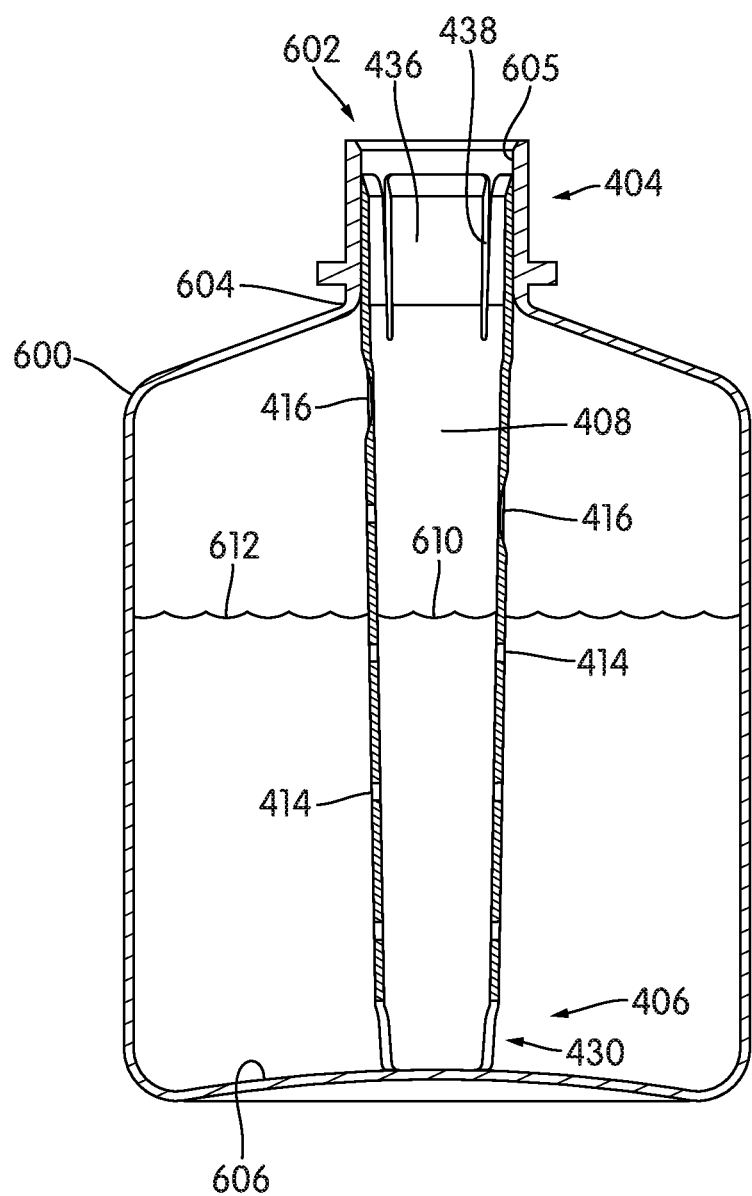
FIG. 11 is a cross-sectional view of an insert and a container, according to an embodiment of the disclosure.

Insert 400 is shown positioned within container 600 in FIGS. 11 and 12. Insert 400 may be inserted into container 600 through an opening 602 at the top of a neck 604 of container 600. As shown in FIGS. 11 and 12, first end 404 of insert 400 may be disposed adjacent to container neck 604 and second end 406 of insert 400 may be in contact with a bottom surface 606 of container 600. Slot(s) 430 of container insert 400 may prevent bottom second end 406 of insert 400 from forming a sealing contact with the bottom surface 606 of the container 600.

In various embodiments, when insert 400 is fully inserted into a container 600, the lower end of each slit 438 separating a pair of tabs 436 may extend below neck 604 of container 600, thereby creating a small vent just below neck 604 of container 600. The small vents may help prevent a vacuum from forming in container 600, and may permit air to escape from the container 600 when it is being filled with liquid. The resilience of the tabs 436, or a bias of the tabs in the radial outward direction may push tabs 436 against the inner surface 605 of a neck 604 of container 600 to secure insert 400 within container 600.

Openings 414 and 416, and slots 430 of insert 400 may allow liquid within the container 600, including particles or beads in suspension, to flow between the space inside insert 400 (e.g., lumen 408) and the space outside insert 400 within container 600. The second openings 416 may be resistant to the formation of films, and may help prevent a vacuum from forming inside of container 600. This may help ensure that the liquid level 610 inside of insert 400 is at substantially the same height as the liquid level 612 outside of insert 400 and within container 600.

Figure 14:
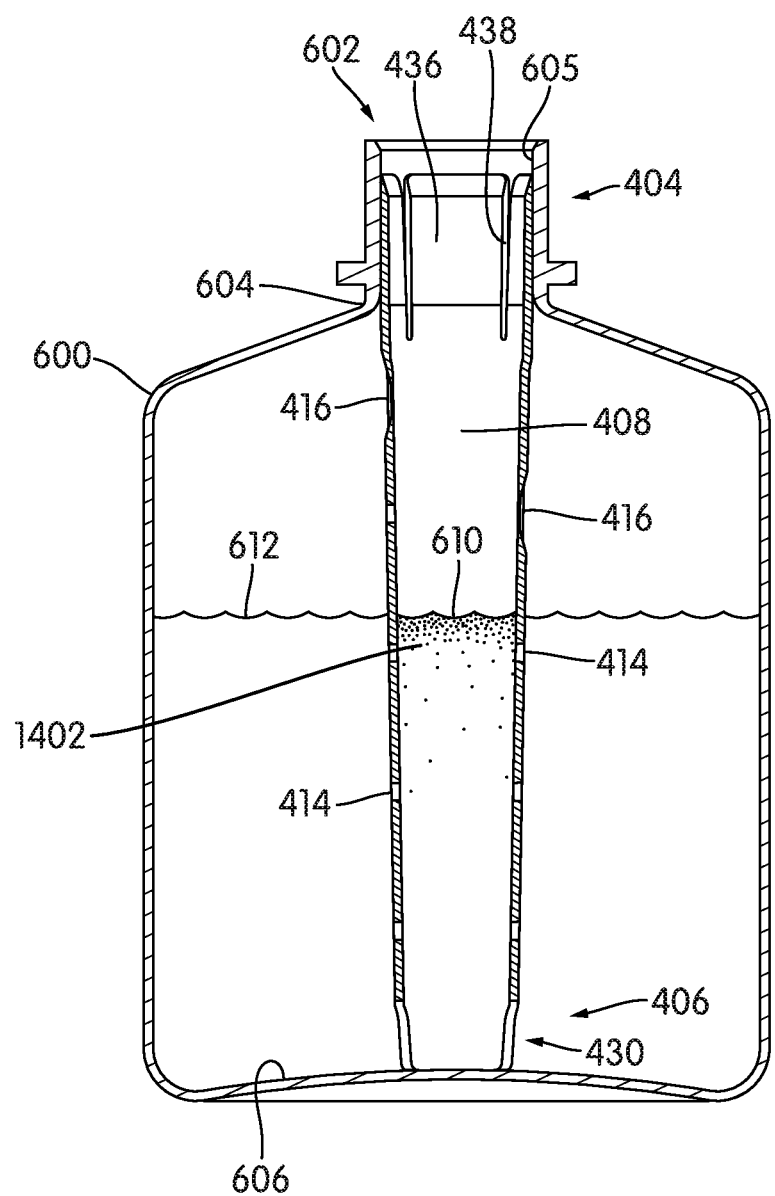
FIG. 14 is a cross-sectional view of the insert and container of FIG. 11, illustrating a gradient in a liquid solution or suspension within the insert.

Referring to FIG. 14, a gradient 1402 may form within insert 400 disposed within container 600. Gradient 1402 may form when a substance is added to a liquid already disposed within container 600 and insert 400. The added substance may be any material added to the liquid that is different than the liquid. Gradient 1402 may remain within insert 400 even after a mixing protocol is carried out by, e.g., liquid container mixing apparatus 100 described above. Gradient 1402 may result from density differences between the added substance and the liquid, and/or the limited liquid exchange between the added substance and the liquid contained within insert 400 and container 600. In addition to a gradient, this disclosure also contemplates that a bilayer may form within insert 400 when, for example, the added substance is a liquid having a lower density than a liquid already present within insert 400 and container 600, or when the added substance has a low miscibility with the liquid already present within insert 400 and container 600. In one embodiment, the liquid may be a reagent used for performing a process or reaction in an analytical test. In some embodiments, the added substance may be an internal control reagent used to minimize the risk of false negative results in an analytical test due to inhibition. The internal control reagent may be less dense than the liquid in insert 400. The internal control may also be used for calibration in an analytical test when starting with a known concentration of the internal control. In one embodiment, the liquid may contain a solid support material, such as magnetically-responsive particles useful in a sample processing procedure for isolating and purifying an analyte of interest. Examples of such procedures are disclosed in U.S. Pat. Nos. 5,234,864, 6,110,678, and 9,051,601.

Gradient 1402 may exhibit a higher concentration of the added substance immediately below liquid level 610 within insert 400. In some embodiments, gradient 1402 may not extend the full length of the liquid containing portion of insert 400. In these embodiments, the added substance in the liquid may be substantially uniform moving away from liquid level 610 within insert 400.

A higher concentration of the added substance immediately beneath liquid surface 610 may affect subsequent processes or reactions relying upon a uniform distribution of the added substance in the liquid. For example, when aliquots of the liquid proximate the initial liquid level 610 are aspirated, the high concentration of the added substance in gradient 1402 may have its greatest effect on the processes or reactions using the liquid, where the effect may be diminished with subsequent aliquots of the liquid aspirated from container 600. It is also contemplated that later processes or reactions may be affected. For example, because of a higher initial concentration of the added substance at the top of gradient 1402, the concentration of the added substance in remaining portions of the liquid may be lower than expected. As a consequence, later processes or reactions using these remaining portions of the liquid may have too little (or none) of the added substance. Furthermore, it also is contemplated that the initial aspirations of the liquid may be from positions that are significantly lower than liquid level 610 within insert 400 (e.g., at or near bottom surface 606), meaning that the first aliquots of liquid may have insufficient concentrations of the added substance.

An insert 1500 is shown in FIG. 15 and FIG. 15A. Insert 1500 may be substantially similar to insert 400 except that one first opening 414 of first row 410 may be replaced with a longitudinally-oriented slit 1514. A longitudinally-oriented slit may have a larger width (along a longitudinal axis of insert 1500) than width (along an axis perpendicular to the longitudinal axis of insert 1500). Unlike slits 438 described above, slit 1514 may be enclosed at both a top end 1514a disposed closer to first end 404 of insert 1500, and at a bottom end 1514b disposed closer to second end 406 of insert 1500. Slit 1514 may be positioned on insert 1500 relative to an anticipated initial liquid level in a container into which insert 1500 will be inserted (e.g., liquid level 610 in container 600 shown in FIG. 15A). Slit 1514 also may be positioned and sized to provide increased exposure of the added substance to the liquid inside container 600, while minimizing evaporation. The positioning of slit 1514 may be such to enable a portion of slit 1514 to be below liquid level 610, and to enable another portion of slit 1514 to be above liquid level 610 (referring to FIG. 15A). This may help ensure adequate mixing of liquids (e.g., liquid solutions or suspensions) contained both within and outside of insert 1500. In the embodiment shown in FIG. 15, slit 1514 may be fully disposed beneath midpoint 460, closer to second end 406 than first end 404, where midpoint 460 is equidistant between an uppermost edge of insert 400 at first end 404 and a bottommost edge of insert 400 at second end 406. It also is contemplated that midpoint 460 may be disposed closer to second end 406 than at least a portion of slit 1514 (e.g., midpoint 460 may be closer to second end 406 than a minority of the length of slit 1514, a majority of the length of slit 1514, or an entirety of the length of slit 1514). In other words, all or at least a portion of slit 1514 may be situated above midpoint 460. These described positions are merely exemplary. Indeed, the positioning of slit 1514 on insert 1500 may be adjusted based on an anticipated initial liquid level in a container where insert 1500 is ultimately deployed. For example, a midpoint of slit 1514 may correspond to the anticipated initial liquid level in the container where insert 1500 is used. However, because the slit has a greater length than, e.g., first openings 414, slit 1514 allows for some variability in the initial liquid level (e.g., the liquid level could be higher or lower than expected). This may be important, because if there are no openings or slits adjacent liquid level 610, then inadequate mixing of the initial liquid and added substance may occur.

Slit 1514 may be collinear with the remaining first openings 414 of first row 410. In yet other embodiments, one or more slits 1514 may not be collinear with any first openings 414. For example, multiple circumferentially-spaced slits 1514 may be provided on insert 1500. The circumferentially-spaced slits may be positioned at staggered heights to accommodate different initial liquid surface heights within insert 1500 and/or a reducing height of liquid surface 610 as the liquid is withdrawn/aspirated. In one embodiment, a length of slit 1514 may be two times a length or diameter of a given first opening 414, although other ratios, including e.g., 3, 4, 5, 6, or greater also are contemplated. Additionally, as shown in FIG. 15, a midpoint of slit 1514 may be closer to an immediately adjacent first opening 414 below slit 1514 (toward second end 406) than an immediately adjacent first opening 414 above slit 1514 (toward first end 404). In other embodiments, a midpoint of slit 1514 may be closer to an immediately adjacent opening above slit 1514 than an immediately adjacent opening below slit 1514, or may be equidistant between adjacent first openings 414 above and below slit 1514. Again, these embodiments are merely exemplary. In yet another embodiment, there may be no first opening 414 or second opening 416 positioned above slit 1514, or there may be only a second opening 416 (and no first opening 414) positioned above slit 1514.

The dimensions that follow are intended to be exemplary only. Furthermore, the dimensions of slit 1514 may be sized to accommodate a solid support in liquid suspension. Additionally, the length of insert 400 and the number and positioning of first openings 414 may depend on a height of container 600, a diameter of the neck of container 600, and an initial anticipated height of liquid in container 600. To limit evaporation, one objective may be to limit the size and number of openings (e.g., first openings 414, second openings 416, and slits 1514). Bottom end 1514b may be disposed about 38.0 mm from the bottommost edge of second end 406, about 37.5 mm to about 38.5 mm from the bottommost edge of second end 406, or another suitable distance. Top end 1514a may be disposed about 50.0 mm from the bottommost edge of second end 406, about 49.5 to about 50.5 mm from the bottommost edge of second end 406, or another suitable distance. Thus, slit 1514 may have a length of about 12.0 mm, from about 11.5 mm to about 12.5 mm, from about 10.0 mm to about 15.0 mm, from about 5.0 mm to about 20.0 mm, above about 5.0 mm, or another suitable length. Slit 1514 also may have a width dimension of about 2.0 mm, from about 1.5 mm to about 2.5 mm, from about 1.0 mm to about 4.0 mm, from about 1.0 mm to about 3.0 mm, or another suitable width. As shown in FIG. 15, slit 1514 may be curved at top and bottom ends 1514a and 1514b such that slit 1514 is generally oval in shape, or rectangular with rounded corners, but other suitable shapes, such as, e.g., strictly rectangular, also are contemplated. A length of slit 1514 may be about 6.0, about 5.0 to about 7.0, about 3.0 to about 10.0, or above about 3.0 times longer than the width of slit 1514.

The embodiment shown in FIG. 15 includes a second opening 416 and chamfer 424. Second opening 416 may be square-shaped, and the four sides of second opening 416 may be defined by a four-sided chamfer 424. Further details regarding second opening 416 and chamfer 424 are set forth above with respect to FIG. 6. In some embodiments, except for the absence of any second openings 416, insert 1600 shown in FIGS. 16 and 16A may be substantially similar to insert 1500 described above.

The insert 1500, 1600 may include one or more first openings 414 situated beneath slit 1514. First openings 414 may facilitate mixing within container 600 and insert 1500, 1600. First openings 414 may be collinear with slit 1514, although this is not a requirement. In one embodiment, there are two sets of collinear openings on opposite sides of insert 1500, 1600. Insert 1500, 1600 may include one or more slits 1514, and in embodiments having more than one slit 1514, the slits 1514 may have different dimensions and positioning on insert 1500, 1600, although similar dimensions may be preferred. In one embodiment, different slits 1514 may be positioned so that liquid level 610 is always positioned between top and bottom ends of at least one slit 1514. The number and dimensions of slits 1514 may be driven by the competing objectives of minimizing evaporation and providing for adequate mixing. Indeed, as shown in FIGS. 15A and 16A, no gradient or bilayer 1402 may be present in containers 600 using insert 1500, 1600.

A first opening 414 and/or a second opening 416 may be situated above slit 1514. Any opening above slit 1514 may facilitate venting. The number and dimensions of openings situated above slit 1514 may be driven by the competing objectives of providing adequate venting and minimizing evaporation. A second opening 416 is preferred in some embodiments because it is less likely to become occluded (than a first opening 414). Such an occlusion could interfere with venting and affect liquid level 610 of the insert. Occlusion may be more likely when, e.g., detergent-based reagents are utilized. Where occlusion is not a concern, a second opening 416 may not be necessary. A chamfer (e.g., chamfer 424) around second opening 416 is optional, but may help prevent occlusion of second opening 416 by reducing the surface area for a film to form. The length of slit 1514 may be at least twice the diameter/height of a first opening 414 (all first openings 414 of insert 1500, 1600 preferably have substantially the same dimensions), and preferably up to 10 times the diameter/height of a first opening. Slit 1514 and first opening 414 may have similar widths, although they may be different.

Inserts 1500, 1600 may include all of the benefits described herein with reference to insert 400, and also may include improved mixing capability relative to insert 400. That is, containers 600 including insert 1500 or 1600 may, after being subjected to a mixing protocol, contain solutions or suspensions with improved homogeneity, compared to containers 600 including insert 400 that are subjected to the same mixing protocol. Furthermore, the evaporation rates exhibited in containers 600 having insert 1500, 1600 may be similar or close to the evaporation rates exhibited in containers 600 having insert 400.

Methods

Figure 13:
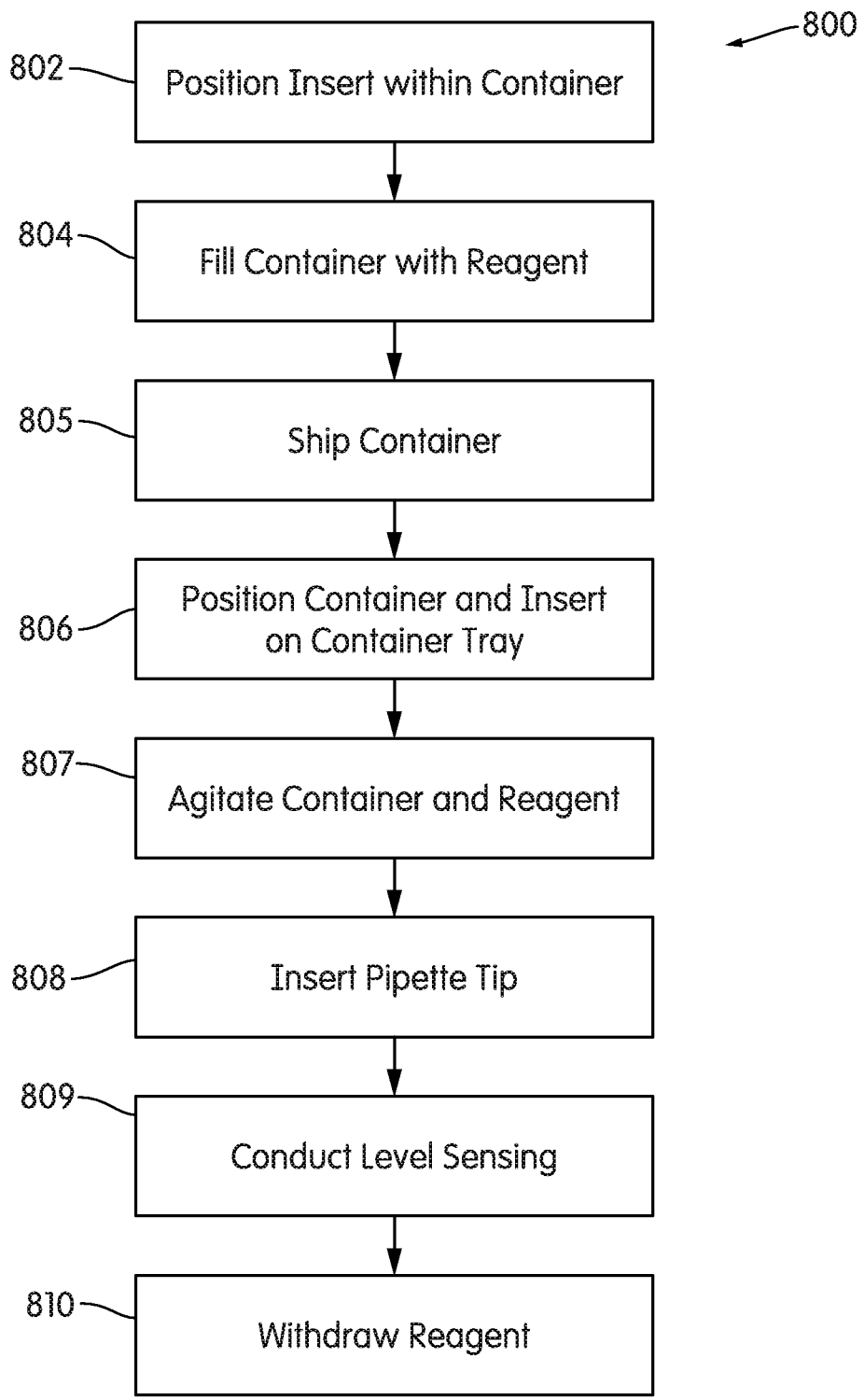
FIG. 13 is a flow chart of a method according to an embodiment of the present disclosure.

A method 800 according to the present disclosure is shown in FIG. 13. Method 800 may begin at step 802, where insert 400 may be positioned inside of container 600. Wherever insert 400 is described with reference to method 800, it also is contemplated that insert 1500 and insert 1600 may be used in the alternative. Method 800 may proceed to step 804, where container 600 is filled with reagent. It is contemplated that the order of steps 802 and 804 may be interchangeable. Method 800 may optionally proceed to step 805, where container 600 is sealed and shipped, for example, to a distributor or end-user. Method 800 then may proceed to step 806, where container 600 and insert 400 may be positioned within container tray 110 (referring to FIG. 1). Method 800 then may proceed to step 807, where the contents of one or more containers 600 in container tray 110 may be mixed and/or agitated by rotation, orbital movement, inversion, vibration, and/or another suitable mixing mechanism as set forth above. After mixing, the concentration of a liquid or a distribution of solid supports within a liquid is substantially the same both inside and outside of insert 400. If uniform mixing cannot be achieved when the reagent includes a solute dissolved in solution, for example, when openings below the liquid surface are too small, or when there are not enough openings below the liquid surface, a sub-optimal concentration of solute may form inside insert 400 (e.g., too high or too low) resulting from evaporation of liquid from inside insert 400. The concentration of solute within insert 400 can be too low when solute precipitates out of solution as a result of disproportionate evaporation within insert 400. In one embodiment, a first mixing protocol after the reagent is loaded into container 600 may include a 30 second mix at 5 Hz followed by a 60 second mix at 3 Hz. Subsequent maintenance mixing protocols may be performed at a regular time interval (e.g., every 30 minutes) and may include mixing the contents of container 600 for 15 seconds at 5 Hz, followed by a 30 second mix at 3 Hz. Mixing protocols may be optimized to minimize the amount of mixing required to keep particles in suspension. Less mixing may result in lower evaporation rates, and less potential for bubbles to form inside insert 400 where they might negatively affect level sensing. Alternative methods of mixing are described in U.S. Pat. No. 7,135,145.

Alternatively, container 600, with insert 400, may be positioned within container tray 110 without containing any liquid therein. In this embodiment, container 600 may be filled with reagent after it is positioned within container tray 110.

As used herein, "solid support" may refer to a solid substance or object of any geometry sufficient to pass through first openings 414 of insert 400. The solid support may include any material that does not appreciably dissolve in a liquid medium in which it is contained. Examples of solid support materials include metal, silica, glass, rubber and plastics. In some embodiments, the solid support is formed from or includes a magnetically-responsive material. In other embodiments, the solid support may be adapted to bind an analyte of interest.

Method 800 may proceed to step 808, where pipette tip 700 and an associated liquid transfer apparatus (e.g., an automated pipettor) may be inserted into container 600. Method 800 then may proceed to step 809, where level sensing may be conducted to signal that the pipette tip 700 has come into contact with reagent within container 600. Once it is determined that pipette tip 700 has come into contact with reagent, pipette tip 700 and the associated liquid transfer apparatus may withdraw an amount of a reagent from one of the containers 600. Pipette tip 700 may withdraw reagent from a container 600 at the same location each time an aliquot of reagent is withdrawn. The withdrawn reagent may be used in one or more assays or other analytical procedures performed by the automatic analyzer. Analytical procedures may include any procedure for determining the presence of analytes in a sample, including, for example, nucleic acid based assays, immunoassays, chemical assays, and the like.

After an amount of reagent is withdrawn, method 800 may proceed to an optional step (not shown in FIG. 13), where a determination is made whether a sensed liquid level of container 600 is above a minimum threshold liquid level (corresponding to the dead volume as set forth above). The determination may be made by any suitable mechanism, such as, e.g., one or more liquid level sensing techniques, including capacitive level sensing and/or any of the techniques described in U.S. Pat. No. 6,914,555. If the sensed liquid level is above the minimum threshold value, method 800 may return to step 808 to mix and/or agitate the container 600 again. The return to step 808 may re-suspend particles that settled out of the suspension when the mixing and agitation was stopped at step 810. If the sensed liquid level at step 812 is below the minimum threshold, container 600 may be refilled with reagent or replaced with a new container 600.

Example One

The following example is intended to illustrate the present disclosure without, however, being limiting in nature. It is understood that the present disclosure encompasses additional examples consistent with the foregoing description.

Comparative studies were conducted using a first container having a first insert with circular openings and two enlarged square openings, a second container having a second insert with only circular openings, and a third container without any insert. The containers had essentially identical dimensions, and the same amount of a saline solution was provided to each of the containers. The first insert included a first row of openings having three circular openings (each with a 2.0 mm diameter) spaced 16 mm from one another, and an enlarged square opening (3.8 mm width) spaced 16 mm from the uppermost of the three circular openings. The outer periphery of the square opening of the first row was bordered by a thinned section (having a thickness of 0.25 mm) formed by a four-sided chamfer. The circular openings were formed in a 1.0 mm thick planar portion of the insert. The first insert included a second row of openings spaced on an opposing side of the first insert. The second row of openings included four circular openings (each with a 2.0 mm diameter) that were each circumferentially aligned with one of the circular or square openings of the first row of openings. The second row of openings also included a square opening (3.8 mm width) bordered by a thinned section (having a thickness of 0.25 mm) spaced 13.0 mm from the uppermost circular opening of the second row. The second insert included two rows of opposed circular openings. Each of the two rows included four circular openings. The positioning of, and the spacing between, the various openings of the second insert were the same as the positioning of, and the spacing between, the various openings of the first insert.

During a first study conducted with a first Panther Fusion® system (Hologic, Inc.; Marlborough, MA), the first container with the first insert having circular openings and enlarged square openings experienced an evaporation rate of 18.0 μL/hr, the second container with the second insert having only circular openings experienced an evaporation rate of 13.9 μL/hr, and the third container without any insert experienced an evaporation rate of about 41.7 μL/hr. During a second study conducted with a second Panther Fusion® system, the first container with the first insert having circular openings and enlarged square openings experienced an evaporation rate of 17.2 μL/hr, the second container with the second insert having only circular openings experienced an evaporation rate of 14.3 μL/hr, and the third container without any insert experienced an evaporation rate of about 40.4 μL/hr. For both studies, the testing protocol/conditions were the same for each container and, with the exception of the inserts, all variables were kept the same between containers. Measurements were taken once per day for each container over a seven day period. The evaporation rates reported are the averages of seven measurements taken over the seven day period.

The comparative studies show that, in at least some embodiments, adding enlarged openings, such as enlarged square openings, to an insert containing only circular openings of the same size may cause a modest increase in the rate of evaporation from a container having the insert. However, the modest increase in the rate of evaporation rate may be acceptable in view of various benefits that may be provided by the enlarged square openings, such as, for example, preventing or limiting vacuum formation within the containers to enable substantially uniform mixing to occur inside and outside of the insert, as well as improved level sensing accuracy.

Example Two

As in Example One above, the following example is intended to be illustrative and not limiting of the present disclosure. It is understood that the present disclosure encompasses additional embodiments consistent with the foregoing description.

In this example, a study was conducted using a fourth container devoid of an insert, a fifth container having an insert with similarly sized circular openings and two enlarged square openings (the first insert from Example One described above), and a sixth container having a fourth insert identical to the first insert, except for the inclusion of an elongate slit which replaced the circular opening at the corresponding location of the first insert. The fourth, fifth, and sixth containers all had similar dimensions. Except where noted, the first and fourth inserts also had similar dimensions. Each of the circular openings of the first and fourth inserts had a diameter of 2.0 mm. The slit had a width of 2.0 mm, with a bottom end of the slit being positioned 38.0 mm from the bottom end of the third insert, and the slit being 12.0 mm in length.

For this study, a free HEX or ROX dye was manually added to an internal control reagent to obtain a final concentration of 0.3 μM. After addition of the dye, 556 μL of the internal control was dispensed into each of the three containers. Before dispensing the internal control reagent into the containers, 176 mL of a sample processing reagent containing magnetically-responsive particles was provided to each of the containers. For the fourth container (no insert), the internal control reagent was dispensed directly into the container, and for the fifth and sixth containers, the internal control reagent was dispensed into the containers via the first and fourth inserts, respectively, using a pipettor. After addition of the dye-containing internal control, each container was mixed by means of the same automated mixing protocol (e.g., an automated mixing protocol as described in U.S. Pat. No. 9,604,185). Following mixing, 450 μL aliquots of each of the resulting mixtures were then serially dispensed into the five tubes of each of 24 integrally formed, multi-tube units (MTUs). A PCR vial for each corresponding tube was then prepared with 20 μL of oil and 30 μL of the mixture from the corresponding tube. A baseline fluorescence measurement was taken for each PCR vial using a thermocycler.

Figure 17:
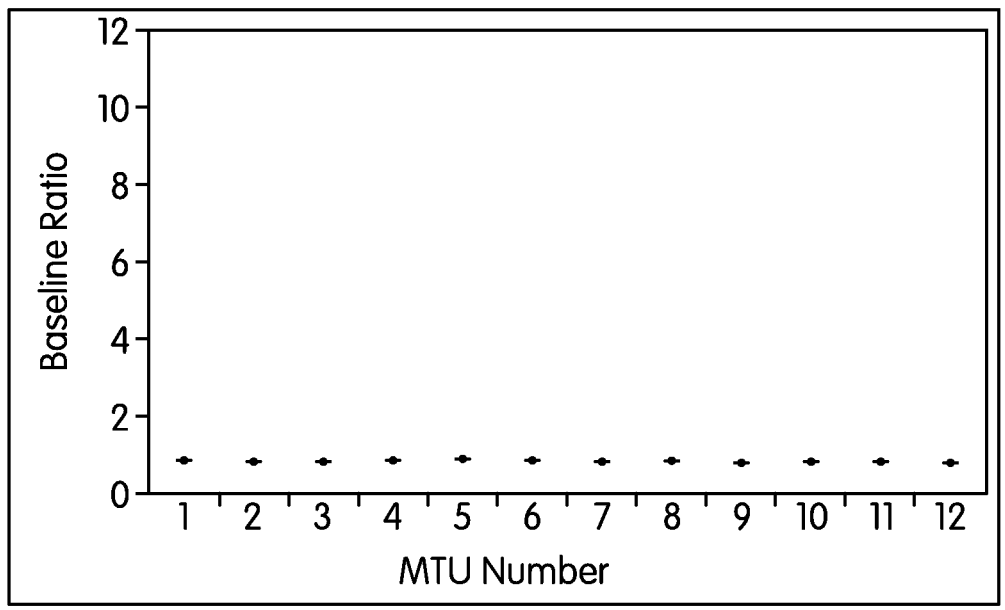
FIGS. 17-19 are dot plots of fluorescence measurements taken under various conditions to show the effect of concentration gradients in liquid solutions or suspensions, such as the gradient shown in FIG. 14, on measurements relying on the liquid solutions or suspensions.
Figure 18:
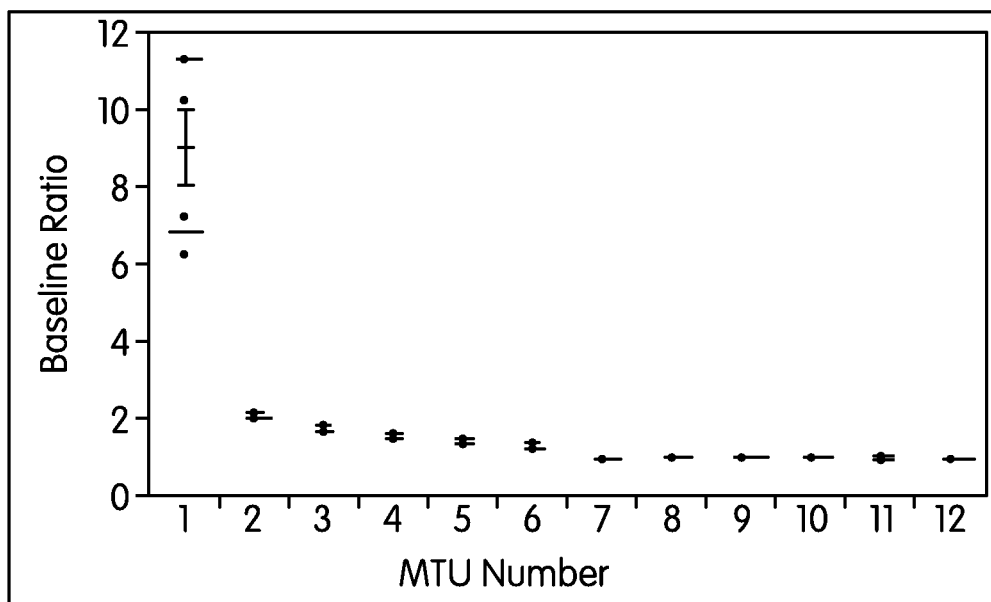
Figure 19:
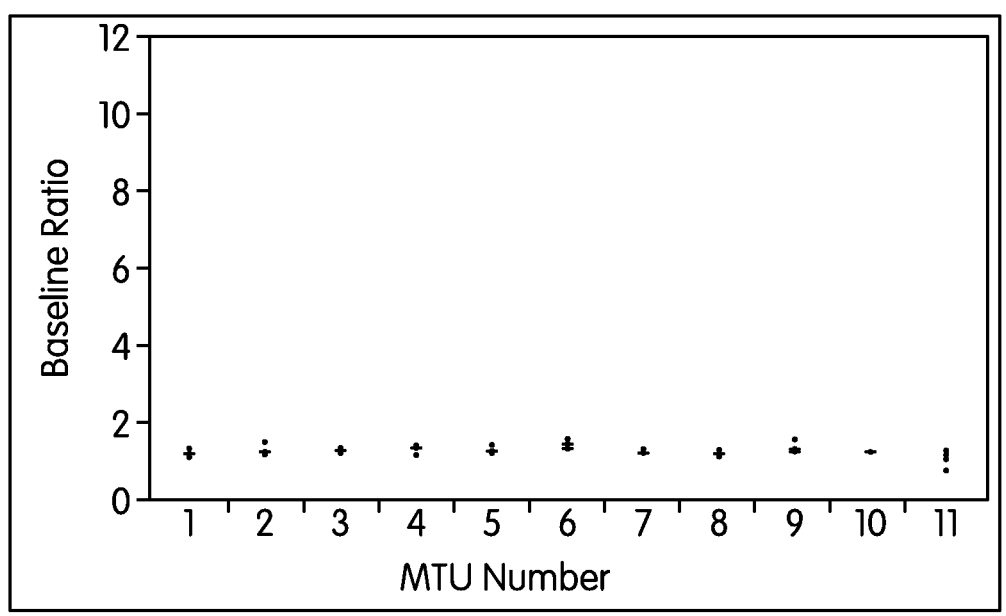

The results of the study are illustrated in FIGS. 17-19, which show dot plots of fluorescence measurements taken from the PCR vials. For each MTU, the Y-axes of these plots represent a ratio of an actual fluorescence measurement and an expected fluorescence measurement for each of the five PCR vials corresponding to the MTU. The expected fluorescence measurements were based on the fluorescence readings of MTUs 13 to 24, where the readings of MTU 1 are compared with the readings of the corresponding tubes of MTU 13, the readings of MTU 2 are compared with the readings of the corresponding tubes of MTU 14, and so on. The X-axes of these plots represent MTUs, where the ordering of MTUs on the X-axes corresponds to the order in which the aliquots were obtained from the containers, going from lowest to highest MTU number.

As expected, the results of FIG. 17 show substantially no variation between the different fluorescent measurements for the twelve MTUs prepared from the mixture of the fourth container (no insert). The results of FIG. 18 clearly show higher fluorescence measurements for the first several MTUs (especially the first MTU) prepared from the mixture of the fifth container (insert without a slit), suggesting the presence of a gradient within the first insert of the fifth container, with a higher concentration of internal control being present near the liquid surface within the first insert, as illustrated in FIG. 14. In a homogeneously mixed container, this ratio of calculated values to estimated values should be approximately 1. As illustrated in FIG. 19, MTUs prepared from the mixture of the sixth container (insert with slit) exhibited substantially no variation in fluorescence measurements, similar to the measurements shown in FIG. 17 for the fourth container.

Example Three

As in Examples One and Two above, the following example is intended to be illustrative and not limiting of the present disclosure. It is understood that the present disclosure encompasses additional embodiments consistent with the foregoing description.

In this example, a study was conducted to compare evaporation rates in containers that included the first insert described in Example One and Two above, to evaporation rates in containers that included the fourth insert described in Example Two above. The evaporation rates were determined using containers having either the first or the fourth insert and containing the same sample processing reagent at volumes of 176 mL, 122 mL, or 72 mL. The containers used in this example all had similar dimensions. After providing the sample processing reagent, the containers were loaded onto a mixing carousel of a Panther Fusion® system, which was maintained at 32° C. and 20% relative humidity for three to seven days.

Figure 20:
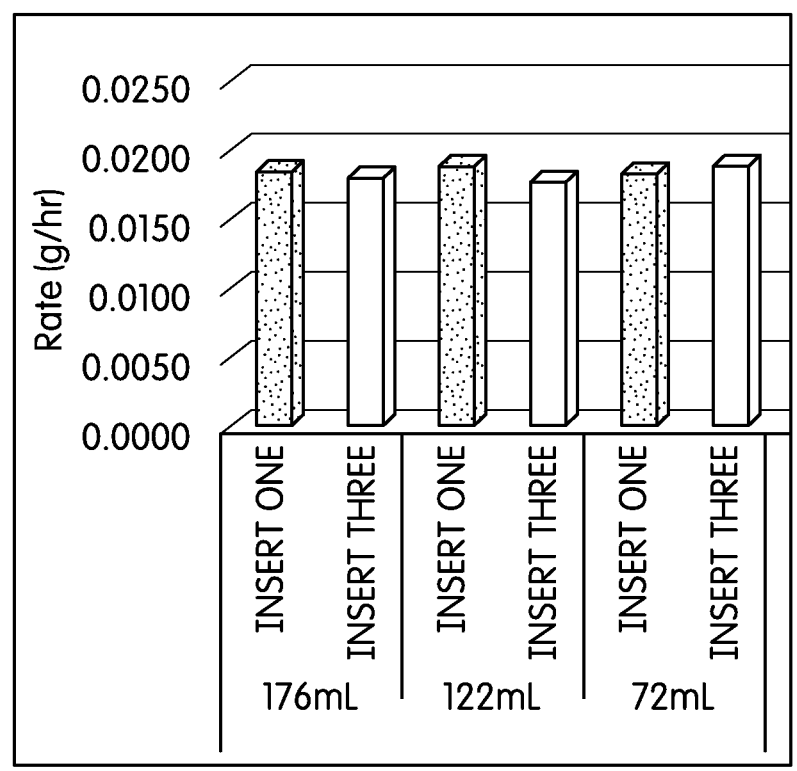
FIG. 20 is a bar graph comparing evaporation rates from various inserts of the disclosure.

As illustrated in FIG. 20, the evaporation rates exhibited in containers having the first and fourth inserts and varying volumes of the sample processing reagent were not measurably different. Thus, while the fourth insert was shown to improve the homogeneity of a liquid containing reagent prone to form a gradient, the addition of a longitudinally-oriented, elongate slit in the insert did not adversely affect the rate of evaporation from corresponding containers.

Each of the U.S. Patent Application Publications and U.S. Patents referred to in the specification is incorporated herein by reference in its entirety.

It will be apparent to those skilled in the art that various modifications and variations can be made in the disclosed systems and processes without departing from the scope of the disclosure. Other embodiments of the disclosure will be apparent to those skilled in the art from consideration of the specification and practice of the disclosure disclosed herein. It is intended that the specification and embodiments be considered as exemplary only.

We claim:

1. An insert for a liquid-holding container, the insert comprising:
   a body comprising a wall, an open top end, an open bottom end, and a generally tubular lumen extending from the open top end to the open bottom end;
   a plurality of first openings formed in the wall, the first openings being situated between the top and bottom ends, wherein each of the plurality of first openings defines an area, wherein the plurality of first openings have substantially the same dimensions, wherein the plurality of first openings are arranged in a first row of at least two of the plurality of first openings in axial alignment with each other and a second row of at least two of the plurality of first openings in axial alignment with each other, and wherein the first and second rows are situated on opposite sides of the body; and
   a pair of second openings formed in the wall between the top and bottom ends, wherein a first one of the pair of second openings is in axial alignment with the first row of first openings and is disposed adjacent to a top one of the first openings in the first row of first openings, wherein a second one of the pair of second openings is in axial alignment with the second row of first openings and is disposed adjacent to a top one of the first openings in the second row of first openings, wherein each opening of the pair of second openings defines an area that is at least about twice the area defined by any opening of the plurality of first openings, wherein the openings of the pair of second openings have substantially the same dimensions, wherein at least one opening of the pair of second openings is situated closer to the top end than any opening of the plurality of first openings, and wherein each opening of the plurality of first openings and each opening of the pair of second openings is sized to permit the passage of a liquid.

2. The insert of claim 1, wherein a thickness of the wall immediately surrounding each of the plurality of first openings is greater than a thickness of the wall immediately surrounding each opening of the pair of second openings.

3. The insert of claim 2, wherein the wall immediately surrounding each opening of the pair of second openings is chamfered.

4. The insert of claim 1, wherein the shape of each opening of the pair of second openings is rectangular or square, and wherein the shape of each opening of the plurality of first openings is circular.

5. The insert of claim 1, wherein a width of each opening of the pair of second openings is at least about 2.0 mm, and wherein a diameter of each of the plurality of first openings is at least about 1.0 mm.

6. The insert of claim 1, wherein a pressure required to dislodge a film of a liquid spanning each opening of the pair of second openings is less than a pressure required to dislodge a film of the liquid spanning any of the plurality of first openings.

7. The insert of claim 1, wherein the body tapers radially inwardly from the top end toward the bottom end.

8. The insert of claim 1, wherein a majority of the openings of the plurality of first openings are situated below a midpoint of a length of the body, and wherein each opening of the pair of second openings is situated above the midpoint of the length of the body.

9. The insert of claim 1, further including at least one recess formed in the bottom end of the insert.

10. The insert of claim 1, wherein the body further includes two or more resilient tabs at the top end of the insert, the tabs being configured to deflect radially inwardly when the insert is inserted into the container and to press resiliently against an inside surface of the container.

11. The insert of claim 10, wherein the body further includes one or more detents at the top end of the insert, the one or more detents being configured to engage with an inner surface of the container to secure the insert within the container.

12. The insert of claim 1, wherein each opening of the pair of second openings is spaced a same distance from the bottom end of the body.

13. The insert of claim 1, wherein each opening of the pair of second openings is spaced at different distances from the bottom end of the body.

14. The insert of claim 1, wherein the body includes one or more planar portions, and each opening of the plurality of first openings and each opening of the pair of second openings is formed in one of the one or more planar portions.

15. The insert of claim 1, wherein the body comprises plastic.

16. The insert of claim 15, wherein the body comprises polypropylene.

* * * * *